(12) United States Patent
Nakagawa et al.

(10) Patent No.: US 9,946,347 B2
(45) Date of Patent: Apr. 17, 2018

(54) INFORMATION PROCESSING APPARATUS, INFORMATION PROCESSING METHOD, AND PROGRAM

(71) Applicant: SONY CORPORATION, Tokyo (JP)

(72) Inventors: Yusuke Nakagawa, Tokyo (JP); Akihiro Komori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 464 days.

(21) Appl. No.: 14/626,025

(22) Filed: Feb. 19, 2015

(65) Prior Publication Data

US 2015/0273322 A1  Oct. 1, 2015

(30) Foreign Application Priority Data

Mar. 26, 2014  (JP) .................. 2014-063909

(51) Int. Cl.
*A63F 13/21* (2014.01)
*G06F 3/01* (2006.01)
*A63F 13/60* (2014.01)
*A63F 13/285* (2014.01)
*A63F 13/424* (2014.01)

(52) U.S. Cl.
CPC ............ *G06F 3/016* (2013.01); *A63F 13/285* (2014.09); *A63F 13/424* (2014.09); *A63F 13/60* (2014.09)

(58) Field of Classification Search
CPC ...... G06F 3/016; A63F 13/285; A63F 13/424; A63F 13/60

USPC .......................................................... 463/37
See application file for complete search history.

(56) References Cited

U.S. PATENT DOCUMENTS

| 6,285,351 | B1* | 9/2001 | Chang | G06F 3/011 345/156 |
| 2006/0290662 | A1* | 12/2006 | Houston | A63F 13/06 345/156 |
| 2008/0158149 | A1* | 7/2008 | Levin | G06F 3/016 345/156 |
| 2011/0128134 | A1* | 6/2011 | Lee | G08B 6/00 340/407.2 |

FOREIGN PATENT DOCUMENTS

JP  2009-072600  4/2009

* cited by examiner

*Primary Examiner* — Allen Chan
(74) *Attorney, Agent, or Firm* — Paratus Law Group, PLLC

(57) ABSTRACT

There is provided an information processing apparatus including an acquisition unit configured to acquire a vibration signal that indicates a detected vibration of a prescribed real object and a sound signal that indicates a collected sound from the real object, a control unit configured to synchronize the acquired vibration signal with the acquired sound signal, and associate the vibration signal and the sound signal with each other, the vibration signal and the sound signal having been synchronized, and a recoding unit configured to record the vibration signal and the sound signal which have been associated with each other.

19 Claims, 15 Drawing Sheets

FIG. 1
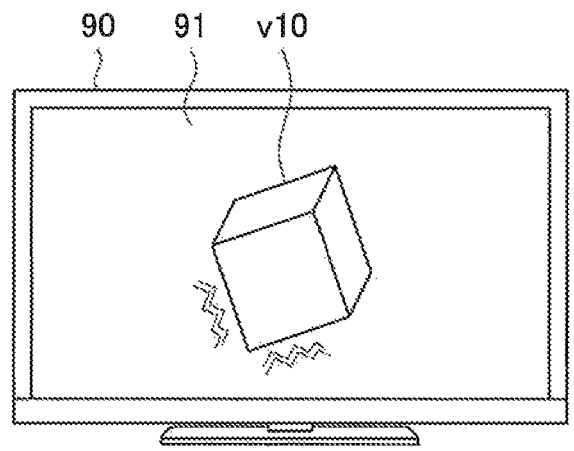
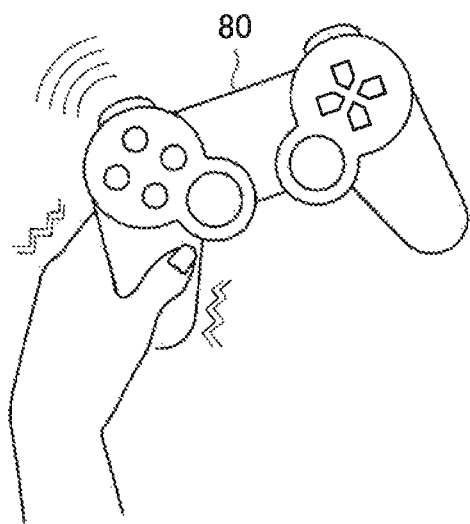

FIG. 4
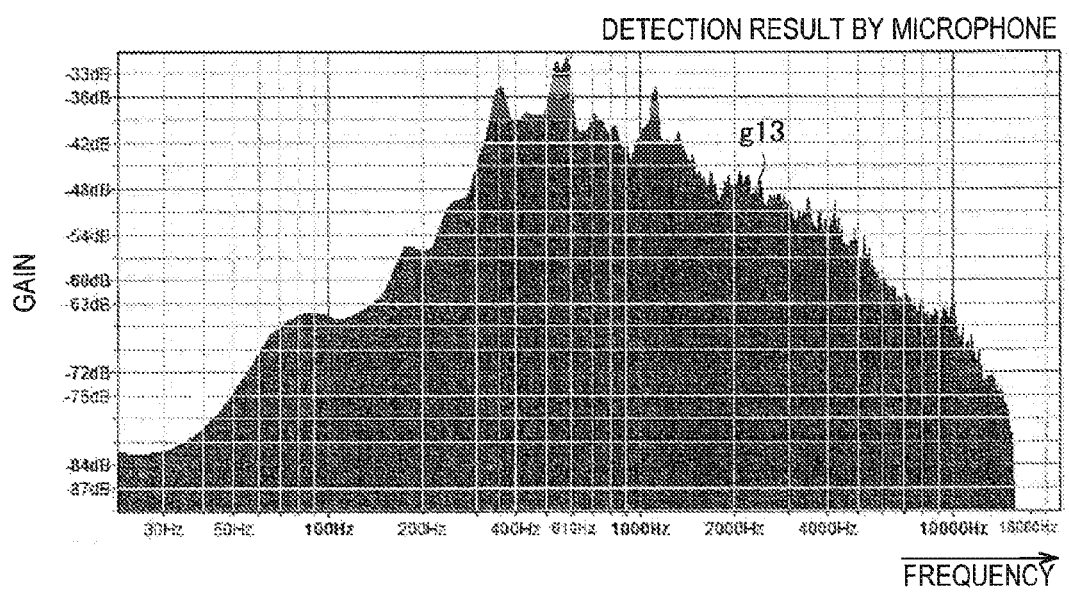
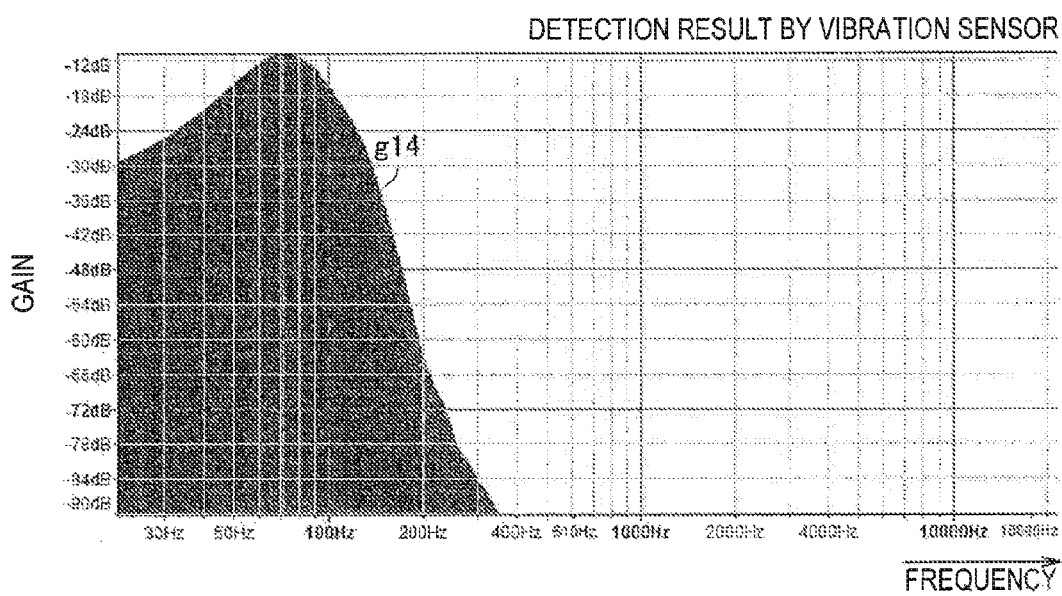

FIG. 8
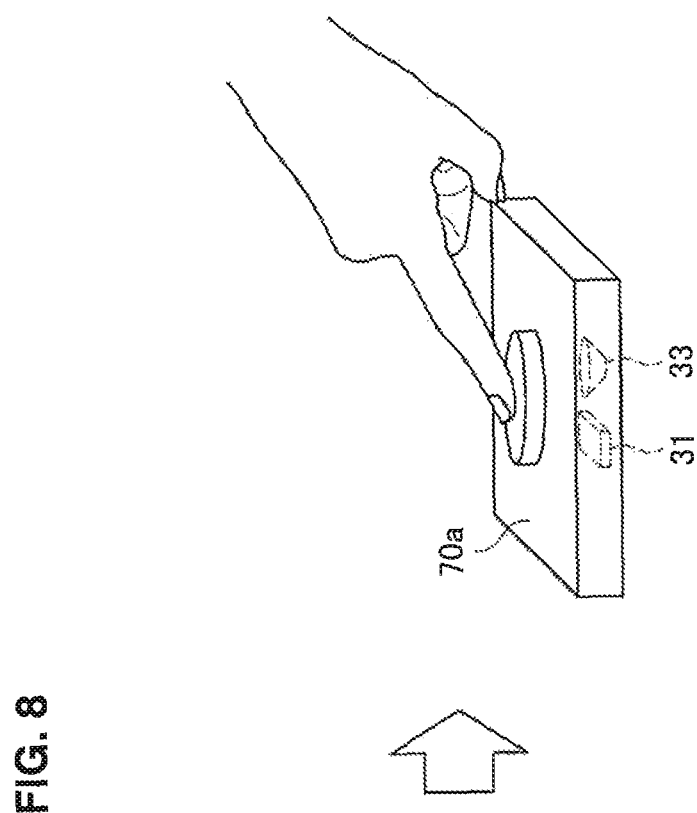
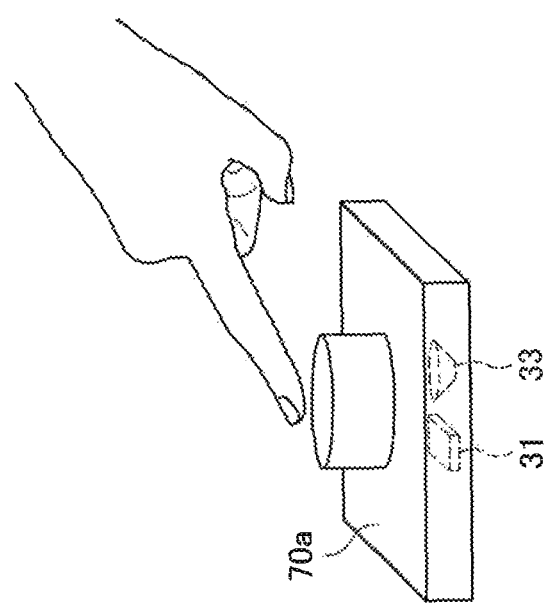

FIG. 9
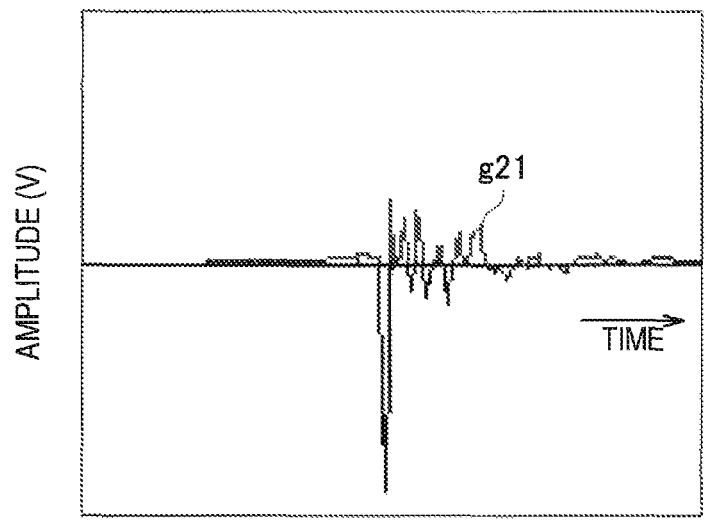
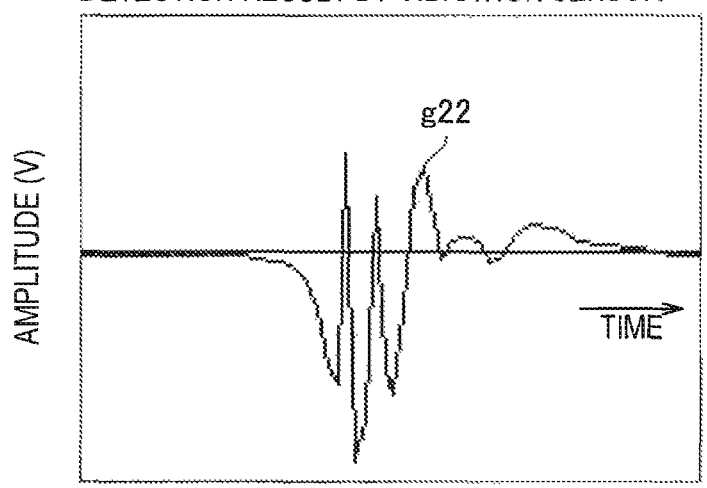

VIBRATION SIGNAL → [10] → ENCODED DATA (d15)

SOUND SIGNAL → d20

| Time t (d21) | Audio (d23) | Tactile x (d251) | Tactile y (d253) | Tactile z (d255) |
|---|---|---|---|---|
| 0 | 5 | 5.2 | 4.9 | -0.2 |
| 0.01 | 1 | 10.2 | 3.2 | -0.1 |
| 0.02 | 4 | 25.3 | 3.4 | 0.0 |
| 0.03 | 20 | 20.8 | 5.1 | 0.1 |
| ⋮ | ⋮ | ⋮ | ⋮ | ⋮ | d25 spans d251, d253, d255

FIG. 16

| Time t | Audio L | Audio R | Tactile L-x | Tactile L-y | Tactile L-z | Tactile R-x | Tactile R-y | Tactile R-z |
|---|---|---|---|---|---|---|---|---|
| 0 | 1 | 5 | 5.2 | 4.9 | -0.2 | 26.0 | 9.8 | -1.0 |
| 0.01 | 2 | 1 | 10.2 | 3.2 | -0.1 | 5.1 | 1.6 | -0.1 |
| 0.02 | 10 | 4 | 25.3 | 3.4 | 0.0 | 10.1 | 1.7 | 0.0 |
| 0.03 | 5 | 20 | 5.2 | 2.6 | 0.1 | 20.8 | 5.1 | 0.3 |
| ... | ... | ... | ... | ... | ... | ... | ... | ... |

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2014-063909 filed Mar. 26, 2014, the entire contents of which are incorporated herein by reference.

BACKGROUND

The present disclosure relates to an information processing apparatus, an information processing method, and a program.

There is a technology which has a loudspeaker and an actuator built-in in various digital devices and enhances a realistic sensation while feeding back a bodily sensation to a user by presenting a pseudo tactile sense or force sense (hereinafter, may be generally referred to as "tactile sense") based on a sound output from this loudspeaker, and a vibration of this actuator.

One specific example of a device which feeds back a bodily sensation to a user includes a controller used for an information processing apparatus such as a game machine. For example, by driving an actuator in this controller based on a user's manipulation contents to the controller, it becomes possible to provide to this user a realistic sensation such that the user actually manipulates an object in a game. Note that, hereinafter, a device which feeds back a bodily sensation to a user may be referred to as a "bodily sensation introduction device" (see JP 2009-72600A).

SUMMARY

On the other hand, a vibration signal for feeding back a tactile sense, using a vibration signal which indicates a prescribed vibration generated in advance or a sound signal output together as a reference signal, may be generated (emulated) by applying signal processings such as controlling an amplitude and a phase to this reference signal, for example. However, when a vibration signal for feeding back a desired tactile sense is generated by applying signal processing to the reference signal in this way, it is necessary to adjust various parameters such as an amplitude and a phase while checking the tactile feedback based on the actually generated signal, and there it sometimes takes time and effort.

In particular, when a tactile feedback is performed in conjunction with a sound signal, it is desirable to output this sound signal and a vibration signal for feeding back a tactile sense at the same timing as a situation and scene to actually emulate in order to perform a tactile feedback with a higher realistic sensation. However, when a vibration signal is generated based on a reference signal, it is necessary for the reproduced tactile feedback to be matched with a situation and scene to actually emulate while an output timing of the generated vibration signal and a sound signal to be output together is adjusted, which takes time and effort so much.

Then, in the present disclosure, there are proposed an information processing apparatus, an information processing method and a program which are new and improved and capable of acquiring easily a signal for presenting a tactile sense by linking a sound and a vibration.

According to an embodiment of the present disclosure, there is provided an information processing apparatus including an acquisition unit configured to acquire a vibration signal that indicates a detected vibration of a prescribed real object and a sound signal that indicates a collected sound from the real object, a control unit configured to synchronize the acquired vibration signal with the acquired sound signal, and associate the vibration signal and the sound signal with each other, the vibration signal and the sound signal having been synchronized, and a recoding unit configured to record the vibration signal and the sound signal which have been associated with each other.

According to another embodiment of the present disclosure, there is provided an information processing method including acquiring a vibration signal that indicates a detected vibration of a prescribed real object, and a sound signal that indicates a collected sound from the real object, synchronizing, by a processor, the acquired vibration signal with the acquired sound signal, and associating the vibration signal and the sound signal with each other, the vibration signal and the sound signal having been synchronized, and recording the vibration signal and the sound signal which have been associated with each other.

According to still another embodiment of the present disclosure, there is provided a program for causing a computer to execute acquiring a vibration signal that indicates a detected vibration of a prescribed real object, and a sound signal that indicates a collected sound from the real object, synchronizing the acquired vibration signal with the acquired sound signal, and associating the vibration signal and the sound signal with each other, the vibration signal and the sound signal having been synchronized, and recording the vibration signal and the sound signal which have been associated with each other.

According to one or more embodiments of the present disclosure as described above, there are provided an information processing apparatus, an information processing method and a program which are capable of acquiring easily a signal for presenting a tactile sense by linking a sound and a vibration.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 1 is a diagram for describing a disadvantage of an information processing system according to a first embodiment of the present disclosure;

FIG. 4 indicates one example of a distribution of frequency components of each of the sound signal and vibration signal indicated in FIG. 3;

FIG. 8 is an explanatory view for describing an outline of the information processing system according to an example 1;

FIG. 9 illustrates one example of a vibration signal output from a vibration sensor, and a sound signal output from a microphone in the information processing system according to the example 1;

FIG. 16 illustrates one example of a data structure of encoded data; and

DETAILED DESCRIPTION OF THE EMBODIMENT(S)

Figure 2:
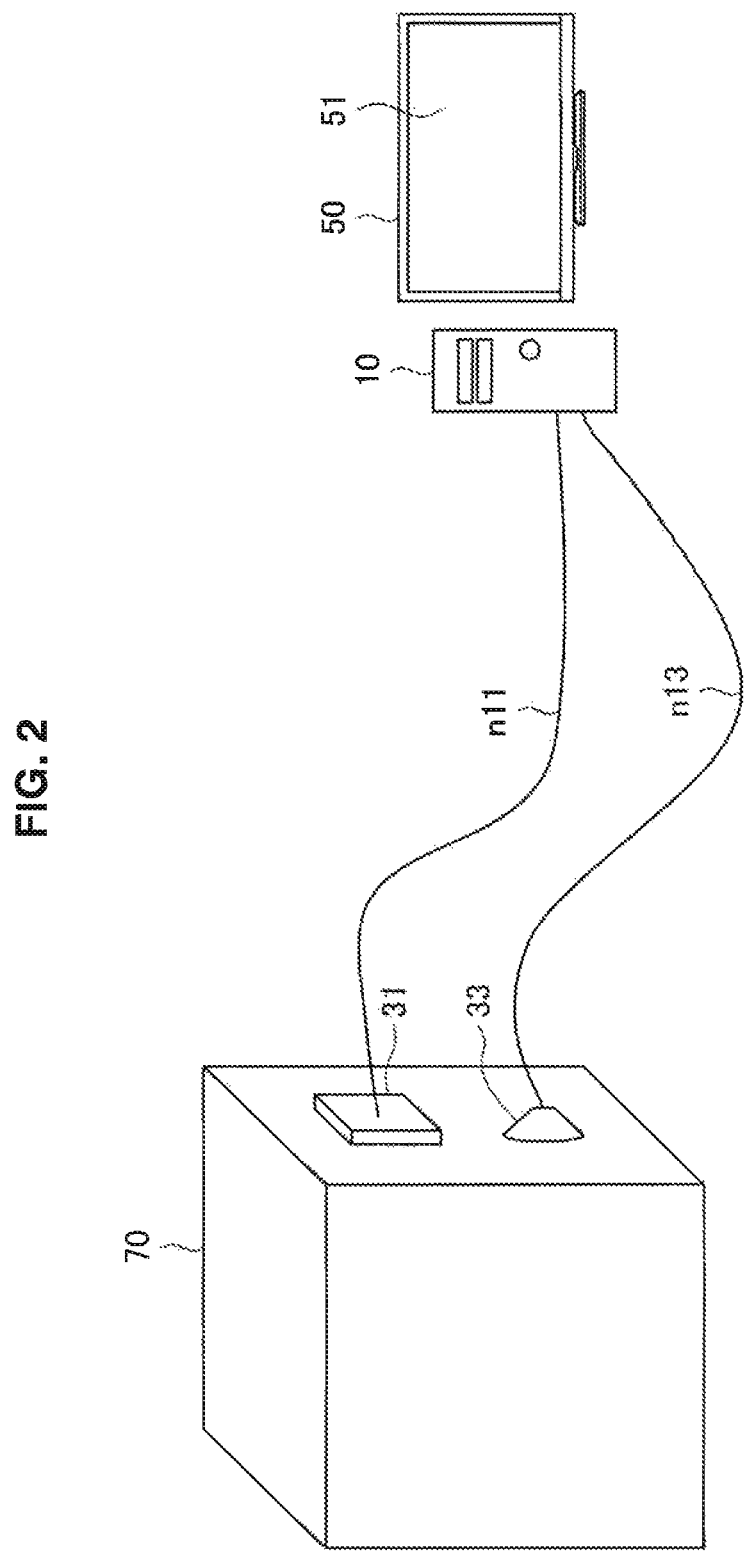
FIG. 2 is an explanatory view for describing a schematic system configuration of the information processing system according to the first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, description will be given in the following order.
1. Embodiment
  1.1. Summary (summarizing of disadvantages)
  1.2. System configuration
  1.3. Function and structure of information processing apparatus
  1.4. Configuration of user interface (UI)
  1.5. Processing
2. Example
  2.1. Example 1: Output control 1 of sound signal and vibration signal
  2.2. Example 2: Output control 2 of sound signal and vibration signal
  2.3. Example 3: Control in a case where dimensions of vibration output differ
  2.4. Example 4: Relation between data format of signal data and signal processing
    2.4.1. Case where sound signal and vibration signal are recorded as separate data
    2.4.2. Case where sound signal and vibration signal are synthesized and recorded
    2.4.3. Case where sound signal and vibration signal are encoded and recorded
3. Hardware configuration
4. Summary

1. EMBODIMENT

1.1. Summary (Summarizing of Disadvantages)

For describing an information processing apparatus according to an embodiment of the present disclosure, first, with reference to FIG. 1, disadvantages of an information processing system according to the present embodiment are organized. FIG. 1 is a figure for describing a disadvantage of the information processing system according to the present embodiment.

In recent years, there has been a technology which has a loudspeaker and an actuator built-in in various digital devices and enhances a realistic sensation while feeding back a bodily sensation to a user by presenting a pseudo tactile sense based on a sound output from this loudspeaker, and a vibration of this actuator.

One specific example of a device which feeds back a bodily sensation to a user includes a controller as illustrated in FIG. 1 used for an information processing apparatus such as a game machine. For example, in an example illustrated in FIG. 1, a user, by manipulating a bodily sensation introduction device 80 configured as a controller, manipulates an object v10 displayed on a display unit 91 (e.g., display) of a display device 90. The information processing apparatus (not illustrated) such as a game machine, while updating the display of the object v10 by receiving the manipulation from a user, feeds back a tactile sense to a user by vibrating an actuator in the bodily sensation introduction device 80. At this time, the information processing apparatus, by outputting a vibration from the actuator and outputting a sound from a loudspeaker provided in the bodily sensation introduction device 80, can realize a tactile sense feedback having a higher realistic sensation.

In this way, the vibration signal for feeding back the tactile sense to a user may be generated (emulated) by applying signal processing such as controlling an amplitude and phase to a signal used as a reference (hereinafter, may be referred to as a "reference signal"). The reference signal includes a vibration signal which indicates a prescribed vibration generated in advance and a sound signal which is output together, for example.

However, when a vibration signal for feeding back a desired tactile sense is generated by applying signal processing to the reference signal as described above, it is necessary to adjust various parameters such as an amplitude and a phase while checking a tactile sense feedback based on an actually generated signal. Therefore, it sometimes takes a great deal of time and effort for reproducing the desired tactile sense.

In particular, when a tactile feedback is performed in conjunction with a sound signal, it is desirable to output this sound signal and a vibration signal for feeding back a tactile sense at the same timing as a situation and scene to actually emulate in order to perform a tactile feedback with a higher realistic sensation. However, when a vibration signal is generated based on a reference signal, it is necessary for the reproduced tactile feedback to be matched with a situation and scene to actually emulate while an output timing of the generated vibration signal and a sound signal to be output together is adjusted, which takes time and effort so much.

Then, in an information processing system according to an embodiment of the present disclosure, it is desirable to acquire a signal (for example, a sound signal and a vibration signal) for presenting a tactile sense by a simple procedure by linking a sound with a vibration, and make the data indicating the acquired signal recordable.

1.2. System Configuration

Next, a schematic system configuration of an information processing system according to the present embodiment will be described with reference to FIG. 2. FIG. 2 is an explanatory view for describing the schematic system configuration of the information processing system according to the present embodiment.

As illustrated in FIG. 2, the information processing system according to the present embodiment includes an information processing apparatus 10, a manipulation object 70, a vibration sensor 31, a microphone 33 and a display 50.

The vibration sensor 31 is provided so as to be installed or built-in in the manipulation object 70 described later. The vibration sensor 31 may be a sensor capable of detecting a vibration based on a change of a motion and direction of the manipulation object 70, such as an acceleration sensor and a gyro sensor (angular velocity sensor), etc. for example, other than a so-called vibration sensor which detects vibration directly. The vibration sensor 31 is configured so as to be able to detect a vibration in a prescribed direction relative to itself. That is, by adjusting a direction in which the vibration sensor 31 is installed with respect to the manipulation object 70, this vibration sensor 31 will be able to detect a vibration of this manipulation object 70 along the prescribed direction.

Note that, the vibration sensor 31 may be configured so as to be able to detect not only a vibration in only one prescribed direction, but also vibrations along a plurality of directions different from each other as respective vibration components (for example, vibration components along an x-direction, y-direction and z-direction which are orthogonal to each other).

In addition, the number of the vibration sensors 31 provided may be not only one, but two or more. For example, when the bodily sensation introduction device 80 includes a plurality of actuators, a plurality of vibration sensors 31 may be provided in accordance with the number of the actuators. Note that, hereinafter, for making an explanation easy to be understood, explanation will be given while the number of the vibration sensors 31 is assumed to be one.

The vibration sensor 31 is connected to the information processing apparatus 10 via a wired or wireless propagation path n11. The vibration sensor 31 detects a vibration of the manipulation object 70 successively, and outputs the signal indicating the detected vibration (that is, vibration signal) to the information processing apparatus 10 successively via the propagation path n11. Note that, when the vibration sensor 31 is configured so as to be able to detect a plurality of vibration components different from each other, the vibration sensor 31 may output the vibration signal for every vibration component to the information processing apparatus 10.

The microphone 33 is a device for collecting a sound output from the manipulation object 70. The microphone 33, by being installed so that a sound-collecting unit for collecting a sound may face a side of the manipulation object 70, collects the sound output from this manipulation object 70, for example. Note that, if sound-collecting of a sound output from the manipulation object 70 is possible, a position at which the microphone 33 is installed is not limited in particular. As one specific example, as illustrated in FIG. 2, the microphone 33 may be installed so that the sound-collecting unit may be closely contacted with the manipulation object 70. In addition, the microphone 33 may be provided near the side of the manipulation object 70.

In addition, the number of the microphone 33 provided may be not only one, but two or more. For example, when the bodily sensation introduction device 80 is provided with a plurality of loudspeakers, the microphone 33 may be provided in plurality in accordance with the number of the loudspeakers. Note that, hereinafter, for making an explanation easy to be understood, explanation will be given while the number of the microphones 33 is assumed to be one.

The microphone 33 is connected to the information processing apparatus 10 via a wired or wireless propagation path n13. The microphone 33 collects successively a sound output from the manipulation object 70, and outputs successively a signal (that is, sound signal) indicating the collected sound to the information processing apparatus 10 via the propagation path n13.

The manipulation object 70 is an object for functioning as an output source of a sound and vibration. In the information processing system according to the present embodiment, a user actually moves the manipulation object 70, thereby emulating movement of an assumed virtual object, for example. As one specific example, when a case where the virtual object moves circularly is emulated, a user may move circularly the manipulation object 70 by moving the object while holding it by hand, for example.

When the manipulation object 70 is moved by a user, a vibration in accordance with a motion of this manipulation object 70 is detected by the vibration sensor 31, and a sound output from this manipulation object 70 is collected by the microphone 33. At this time, it is needless to say that a vibration detected by the vibration sensor 31 is a vibration generated by movement of the manipulation object 70, and in the same way, a sound collected by the microphone 33 is a sound generated by movement of this manipulation object 70.

As mentioned above, a vibration and a sound generated by movement of the manipulation object 70 are detected by the vibration sensor 31 and the microphone 33, and a vibration signal indicating this vibration and a sound signal indicating this sound are output to the information processing apparatus 10.

The information processing apparatus 10 synchronizes a vibration signal output from the vibration sensor 31 with a sound signal output from the microphone 33, and records the synchronized vibration signal and sound signal as data in association with each other.

Figure 3:
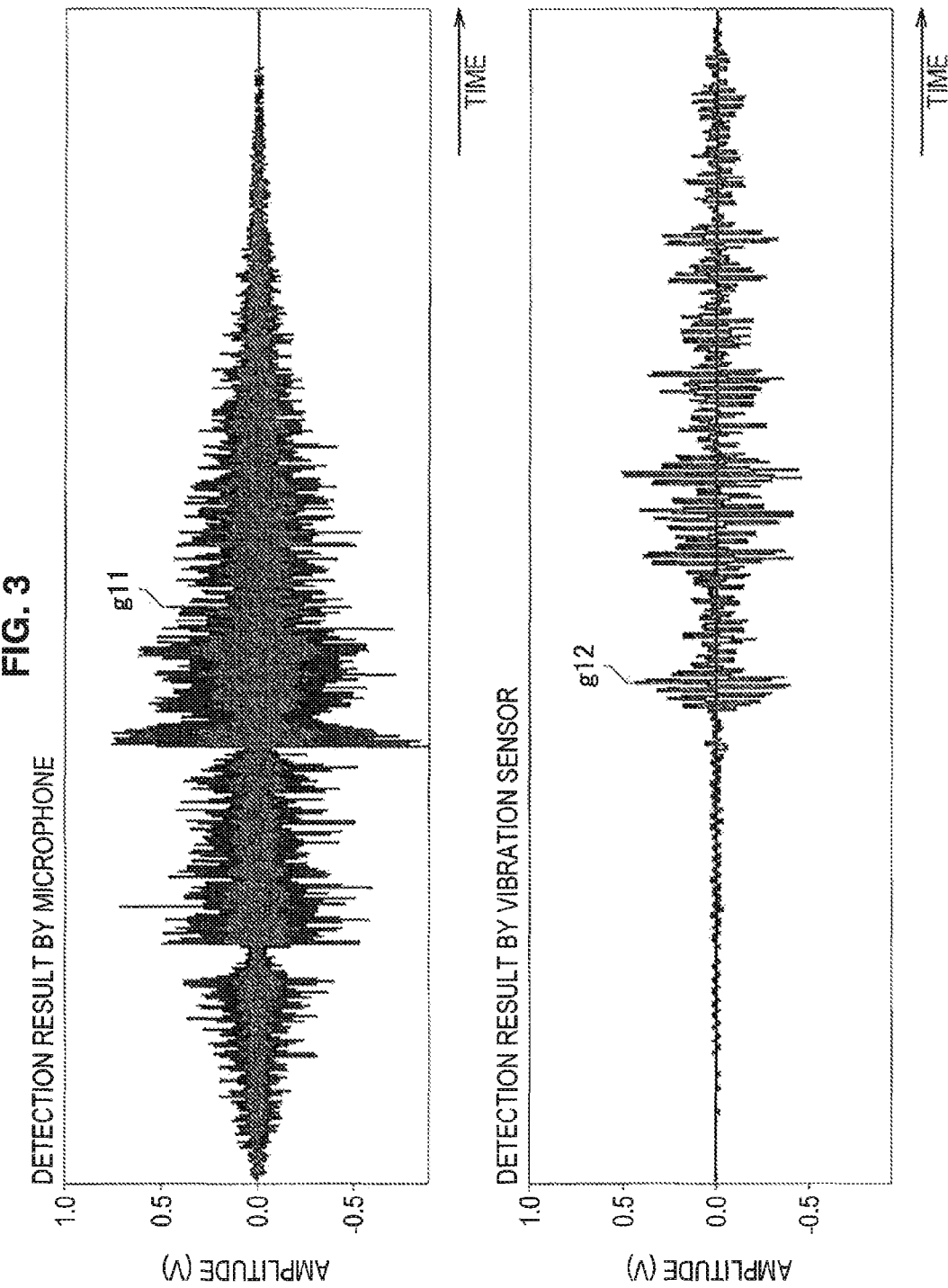
FIG. 3 indicates one example of a vibration signal output from a vibration sensor and a sound signal output from a microphone in the information processing system according to the first embodiment.

For example, FIG. 3 indicates one example of the vibration signal output from the vibration sensor 31 and the sound signal output from the microphone 33 in the information processing system according to the present embodiment. As for each graph indicated in FIG. 3, a horizontal axis indicates a time, and a vertical axis indicates an amplitude (V) of the signal, i.e., a change of a voltage value as an amplitude. The signal denoted by a reference symbol g11 indicates one example of a waveform of the sound signal output from the microphone 33, i.e., the sound signal which is output from the manipulation object 70 and collected by the microphone 33. In addition, the signal denoted by a reference symbol g12 indicates one example of a waveform of the vibration signal output from the vibration sensor 31, i.e., the vibration signal indicating a vibration of the manipulation object 70 detected by the vibration sensor 31.

In addition, FIG. 4 indicates one example of a distribution of frequency components at a certain timing of each of the sound signal and the vibration signal indicated in FIG. 3. As for each graph indicated in FIG. 4, a horizontal axis indicates a frequency, and a vertical axis indicates a gain of the signal. The signal denoted by a reference symbol g13 indicates a frequency distribution of the sound signal output from the microphone 33, and corresponds to the sound signal g11 in FIG. 3. In the same way, the signal denoted by a reference symbol g14 indicates a frequency distribution of the vibration signal output from the vibration sensor 31, and corresponds to the vibration signal g12 in FIG. 3.

The information processing apparatus 10 according to the present embodiment synchronizes the sound signal with the vibration signal as indicated in FIGS. 3 and 4, and records this sound signal and this vibration signal as data in association with each other. Note that, the information processing apparatus 10 may record as data the sound signal and the vibration signal indicated in FIGS. 3 and 4 based on a format for recording a sound (vibration) such as waveform (WAV) or MPEG audio layer-3 (MP3), for example. In addition, as another example, the information processing apparatus 10, by encoding the sound signal and the vibration signal indicated in FIGS. 3 and 4, may record this sound signal and this vibration signal as data by an original format. Note that, details with respect to processing for synchronizing the sound signal with the vibration signal, and processing for recording this sound signal and this vibration signal as data, which are performed by the information processing apparatus 10, will be described later separately.

It is needless to say that it becomes possible to control a sound output from a loudspeaker and a vibration output from an actuator in the bodily sensation introduction device 80 as indicated in FIG. 1 based on the data recorded as mentioned above. That is, a sound is made to be output from the loudspeaker of the bodily sensation introduction device 80 based on a sound signal in the data, and an actuator of the bodily sensation introduction device 80 is made to be driven based on a vibration signal, and thereby, it becomes possible to reproduce easily a sound and a vibration from the manipulation object 70 at the time of recording the data.

In particular, when two or more loudspeakers and actuators are provided in the bodily sensation introduction device 80, it is necessary to adjust vibration of each actuator in order to reproduce a desired tactile sense feedback by applying signal processing to a reference signal, and it sometimes takes a great deal of time and effort. On the other hand, according to the information processing system according to the present embodiment, two or more vibration sensors 31 and microphones 33 may be provided on the manipulation object 70 in accordance with a configuration of the bodily sensation introduction device 80, and signals from the respective vibration sensors 31 and microphones 33 may be recorded as data.

Specifically, each actuator and each loudspeaker in the bodily sensation introduction device 80 and each vibration sensor 31 and each microphone 33 which are installed in the manipulation object 70 are associated with each other. At this time, in accordance with an arrangement of each loudspeaker and each actuator in the bodily sensation introduction device 80, positions where each vibration sensor 31 and each microphone 33 are installed on the manipulation object 70 may be adjusted. In addition, as the manipulation object 70, an object having a shape close to the shape of the bodily sensation introduction device 80 may be used.

Based on the configuration like this, the information processing apparatus 10 synchronizes the vibration signal output from each vibration sensor 31 with the sound signal output from each microphone 33, and records them as data in association with each other. Then, based on the sound signal and the vibration signal in the recorded data, a vibration output of each actuator of the bodily sensation introduction device 80 and a sound output from each loudspeaker may be controlled. Based on such a configuration, the information processing system according to the present embodiment will be able to realize easily a tactile sense feedback based on sound outputs from two or more loudspeakers, and vibration outputs from two or more actuators.

1.3. Function and Structure of Information Processing Apparatus

Figure 5:
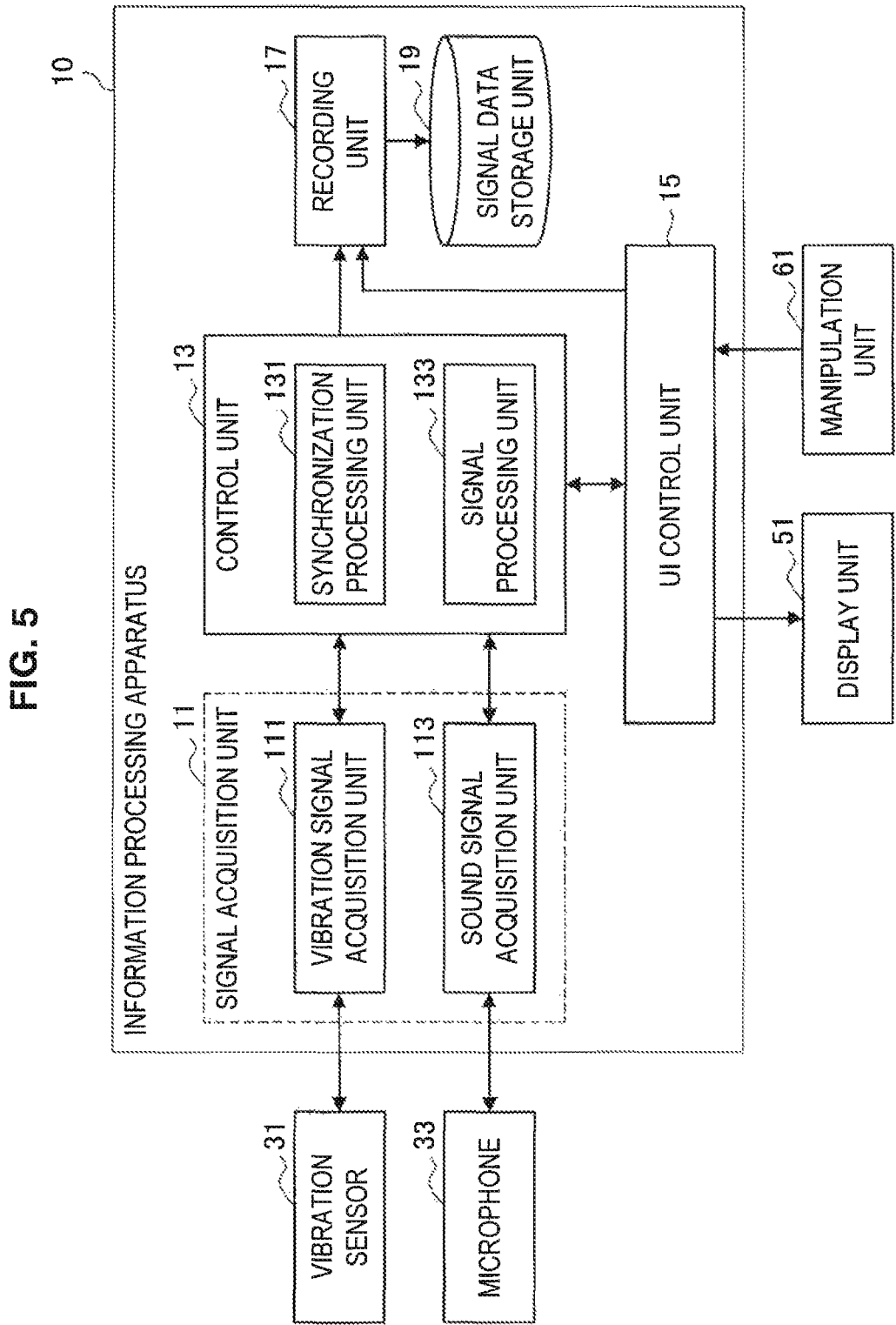
FIG. 5 is a block diagram illustrating one example of a function and structure of the information processing apparatus according to the first embodiment.

Next, with reference to FIG. 5 in conjunction with FIG. 2, one example of a function and structure of the information processing apparatus 10 according to the present embodiment will be described. FIG. 5 is a block diagram illustrating one example of the function and structure of the information processing apparatus 10 according to the present embodiment.

As illustrated in FIG. 5, the information processing apparatus 10 according to the present embodiment includes a signal acquisition unit 11, a control unit 13, a UI control unit 15, a recording unit 17 and a signal data storage unit 19. In addition, the signal acquisition unit 11 includes a vibration signal acquisition unit 111 and a sound signal acquisition unit 113. In addition, the control unit 13 includes a synchronization processing unit 131 and a signal processing unit 133.

The vibration signal acquisition unit 111 acquires a vibration signal indicating a vibration of the manipulation object 70 (refer to FIG. 2) detected by the vibration sensor 31 from this vibration sensor 31 successively via the propagation path n11. The vibration signal acquisition unit 111 outputs the acquired vibration signal to the control unit 13 successively.

In the same way, the sound signal acquisition unit 113 acquires successively the sound signal indicating a sound which is output from the manipulation object 70 and collected by the microphone 33 via the propagation path n13 from this microphone 33. The sound signal acquisition unit 113 outputs successively the acquired sound signal to the control unit 13.

The synchronization processing unit 131 acquires successively the vibration signal detected by the vibration sensor 31 from the vibration signal acquisition unit 111, and acquires successively the sound signal collected by the microphone 33 from the sound signal acquisition unit 113. Then, the synchronization processing unit 131 synchronizes the acquired vibration signal with the sound signal.

As one specific example, a length of each of the propagation paths n11 and n13 is not necessarily constant. Therefore, a difference may arise in a time until the vibration signal output from the vibration sensor 31 and the sound signal output from the microphone 33 reach the information processing apparatus 10 via each of the propagation paths n11 and n13. In addition, besides the difference in the length of the propagation path, due to, in a precise sense, a difference of a circuit configuration in each of the vibration sensor 31, the microphone 33, the vibration signal acquisition unit 111 and the sound signal acquisition unit 113, a delay may arise within these circuits.

Then, the synchronization processing unit 131 calculates an amount of a delay (hereinafter, may be referred to as "delay amount") generated between the acquired sound signal and vibration signal, and by delaying at least any one of the sound signal and the vibration signal in accordance with the calculated delay amount, synchronizes this sound signal with this vibration signal.

For example, the synchronization processing unit 131, based on a waveform of at least a part of signal in the acquired sound signal and a waveform of at least a part of signal in the acquired vibration signal, may calculate a delay amount between this sound signal and this vibration signal.

As one specific example, the synchronization processing unit 131, based on the sound signal and the vibration signal which are acquired when this object 70 moves so that a position and direction of the object 70 may change abruptly, may calculate a delay amount between this sound signal and this vibration signal. Note that, one example of a method of moving the object 70 includes a method in which a user performs manipulating such as striking and shaking with respect to the manipulation object 70. In addition, as another example, an actuator may be installed on the object 70, and this actuator may be driven, thereby vibrating this object 70.

In this way, when the object 70 moves so that an own position and direction may change abruptly, a sharp signal in which an amplitude changes abruptly will be detected as a signal of each of the sound signal collected by the microphone 33 and the vibration signal detected by the vibration sensor 31.

In this case, the synchronization processing unit 131, for example, may recognize a peak position (position on a time series) of a waveform of each of the acquired sound signal and vibration signal as the same position along a time series between this sound signal and this vibration signal, and may calculate a delay amount between this sound signal and this vibration signal. In addition, besides a peak position, when, based on a waveform of each of the sound signal and the vibration signal, a delay amount between this sound signal and this vibration signal can be calculated, a method of calculating this delay amount is not limited in particular. For example, the synchronization processing unit 131, based on a position (position on a time series) where a waveform of each of the sound signal and the vibration signal rises up, may calculate a delay amount between this sound signal and this vibration signal.

In addition, a method described above of synchronizing the vibration signal with the sound signal is merely one example, and when synchronizing the vibration signal with the sound signal is possible, a method thereof is not limited in particular. As one specific example, the information processing apparatus 10, based on a theoretical value of a delay amount calculated in advance based on the used propagation path and circuit configuration of a device, by delaying at least one of the vibration signal and the sound signal, may synchronize this vibration signal with this sound signal.

After calculating a delay amount between the sound signal and the vibration signal, the synchronization processing unit 131, by delaying at least any one of the sound signal and the vibration signal based on the calculated delay amount, synchronizes this sound signal with this vibration signal. Then, the synchronization processing unit 131 outputs the sound signal and the vibration signal which are synchronized to the signal processing unit 133.

Note that, a timing in which the synchronization processing unit 131 synchronizes the acquired sound signal with the vibration signal is not limited in particular. For example, the synchronization processing unit 131, when receiving an instruction from a user via the UI control unit 15, may compare the acquired sound signal and vibration signal, and may synchronize this sound signal with this vibration signal. In this case, the synchronization processing unit 131 may notify the UI control unit 15 of information for displaying a waveform of the acquired sound signal and vibration signal. Thereby, the UI control unit 15, as a monitoring result of the acquired sound signal and vibration signal, will be able to present a waveform of each signal to a user. Note that, the information for displaying a waveform of the sound signal and the vibration signal may include the information, etc. indicating a change of an amplitude along a time series of each of this sound signal and this vibration signal, for example.

In addition, as another example, the synchronization processing unit 131 may analyze a waveform of the acquired sound signal and vibration signal for each predetermined timing, and may synchronize this sound signal with this vibration signal based on the analysis result. In this case, the synchronization processing unit 131 may detect a waveform having a characteristic shape (for example, waveform in which an amplitude changes abruptly) from among the sound signal and the vibration signal, and based on the detected waveform, may synchronize this sound signal with this vibration signal, for example.

The signal processing unit 133 acquires the synchronized sound signal and vibration signal from the synchronization processing unit 131, and applies signal processing (for example, a amplitude control, etc., based on a control of a gain and volume) to at least any one of the acquired sound signal and vibration signal. Then, the signal processing unit 133 outputs the synchronized sound signal and vibration signal after the signal processing in association with each other to the recording unit 17 described later. Note that, details of the signal processing by the signal processing unit 133 will be described below while examples are given specifically.

As one specific example, the signal processing unit 133 may control an amplitude of at least one of the synchronized sound signal and vibration signal as signal processing. For example, by adjusting a gain ratio between a gain of the sound signal and a gain of the vibration signal, it becomes possible to control a tactile feeling of a tactile sense reproduced based on this sound signal and vibration signal. In addition, a vibration signal may be perceived by a user as a sound, and it becomes also possible to alleviate an influence like this by adjusting an amplitude of each of the sound signal and the vibration signal. Note that, details will be described later separately as examples 1 and 2.

In addition, the signal processing unit 133 may generate a synthesized signal by synthesizing the synchronized sound signal and vibration signal. As one specific example, there is a case where the bodily sensation introduction device 80 applies a voice coil motor in which a loudspeaker and an actuator are constituted integrally, and outputs a sound and vibration by driving this voice coil motor based on one control signal.

In such a case, for example, the signal processing unit 133 extracts a signal in a low frequency band no more than a prescribed frequency (for example, no more than 1000 Hz) within the acquired vibration signal, and a signal in a high frequency band no less than a prescribed frequency (for example, no less than 300 Hz) within the acquired sound signal. Then, the signal processing unit 133 may synthesize the extracted vibration signal of the low frequency band and sound signal of the high frequency band to generate a synthesized signal. Note that, at this time, the signal processing unit 133 may determine a frequency used as a threshold value for extracting each signal so that at least a part of each frequency band may be overlapped mutually between the vibration signal and the sound signal. In addition, it is needless to say that a signal of a desired frequency band can be taken out by applying various filters (a low pass filter, a high pass filter, or a band pass filter) to each of the sound signal and the vibration signal, for example.

Note that, when having generated the synthesized signal, the signal processing unit 133 will output the generated synthesized signal to the recording unit 17. In addition, in this case, the signal processing unit 133, by synthesizing the synchronized sound signal and vibration signal, associates this sound signal with this vibration signal.

In addition, also in a case where the sound signal and the vibration signal are not synthesized, the signal processing unit 133 may extract only a signal of a desired frequency band from each of this sound signal and vibration signal, and may output extracted each signal (that is, sound signal and vibration signal) to the recording unit 17 in association with each other.

In addition, it is preferred that a sampling rate of the sound signal and vibration signal is the same. Therefore, the signal processing unit 133, when the sampling rate differ between the synchronized sound signal and vibration signal, may convert one sampling rate in accordance with the other sampling rate.

As one specific example, a sampling rate of the microphone 33 which collects a sound is sometimes higher than a sampling rate of the vibration sensor 31 which detects a vibration. In addition, in a data format for recording the sound signal and the vibration signal, there is a data format in which it is difficult to record signals each having a different sampling rate while being synthesized or associated with each other. As one specific example, in a case of a data format in which information of each signal is recorded by sample units along a time series, it may be difficult to record the sound signal and vibration signal which differ from each other in a sampling rate while maintaining the synchronized state.

Then, the signal processing unit 133, for example, by applying up-sampling processing to the vibration signal having a low sampling rate, may convert a sampling rate of the vibration signal in accordance with the sound signal having a high sampling rate.

Note that, when performing the up-sampling processing, the signal processing unit 133, for example, based on each sample data in the signal to be a target, complements new sample data at a position (for example, position on a time series) where this each sample data does not exist. At this time, the signal processing unit 133, for example, may apply sample data located near the position to be interpolated (for example, position on a time series) as new sample data to be complemented. In addition, as another example, the signal processing unit 133, for example, based on an intermediate value or average value of the sample data located near the position to be interpolated (for example, position on a time series), may generate the new sample data to be complemented.

In addition, the signal with the sample data complemented may not be necessarily a signal changing continuously along a time series, and may be a signal showing a discontinuous waveform. Then, the signal processing unit 133, by applying a filter (for example, low pass filter) to the signal with the sample data complemented, may convert this signal into a signal changing continuously along a time series.

Note that, although an example in which a sampling rate is converted by up-sampling processing is described in the above, a method thereof is not limited in particular when the conversion can be carried out so that the sampling rate may coincide between the sound signal and the vibration signal.

As one specific example, the signal processing unit 133, for example, by applying down-sampling processing to the sound signal having a high sampling rate, may convert the sampling rate of the sound signal in accordance with the vibration signal having a low sampling rate.

In addition, the signal processing unit 133, when a dimension of a vibration direction indicated by the acquired vibration signal differs from a dimension of a direction in which an actuator of the bodily sensation introduction device 80 vibrates, may generate another vibration signal from the acquired vibration signal in accordance with the vibration direction of this actuator. Note that, details thereof will be described later separately as an example 3.

In addition, the signal processing unit 133 may determine signal processing to be applied in accordance with a data format for recording the sound signal and vibration signal as signal data. For example, when recording the sound signal and vibration signal as signal data by using a data format where recording a plurality of signals separately is difficult, the signal processing unit 133 may generate a synthesized signal by synthesizing the synchronized sound signal and vibration signal, for example.

In addition, it is needless to say that the signal processing unit 133 may suitably combine and execute each signal processing described above. In addition, the signal processing unit 133 may determine based on an instruction from a user which one among each signal processing described above is to be applied. Note that, the instruction from a user is notified to the signal processing unit 133 and the above-mentioned synchronization processing unit 131 via the UI control unit 15 described later, for example. As a matter of course, it is needless to say that the signal processing unit 133 does not necessarily apply signal processing to the acquired sound signal and vibration signal. When not applying signal processing to the sound signal and the vibration signal, the signal processing unit 133 may output the acquired sound signal and vibration signal to the recording unit 17 in association with each other.

In addition, when the synchronized sound signal and vibration signal after signal processing can be associated with each other, a method thereof is not limited in particular. For example, the signal processing unit 133, by outputting the synchronized sound signal and vibration signal to the recording unit 17 as a series of data, may show to the recording unit 17 that this sound signal and this vibration signal are associated with each other. In addition, as mentioned above, the signal processing unit 133, by synthesizing the synchronized sound signal and vibration signal, may associate this sound signal with this vibration signal.

The UI control unit 15 is a control unit for controlling a user interface (hereinafter, may be referred to as "user interface (UI)") for a user to perform, to the information processing apparatus 10, an instruction related to synchronization between the acquired sound signal and vibration signal and a designation of signal processing applied to the synchronized sound signal and vibration signal.

The UI control unit 15 generates the UI (in other words, manipulation screen) for a user to perform the manipulation mentioned above, and makes the generated UI displayed on a display unit 51. In addition, the UI control unit 15 acquires, from a manipulation unit 61, control information indicating contents of the manipulation performed for the UI displayed on the display unit 51 via this manipulation unit 61. Then, the UI control unit 15, based on the control information acquired from the manipulation unit 61, recognizes manipulation contents performed by a user, and notifies the control unit 13 of the manipulation contents. Thereby, it becomes possible for the control unit 13 to execute various kinds of processing (for example, synchronous processing and signal processing) in accordance with user's manipulation contents. Note that, one specific example of UI presented by the UI control unit 15 will be described later separately.

The recording unit 17 acquires the sound signal and vibration signal which are synchronized and associated with each other from the signal processing unit 133. The recording unit 17 stores the acquired sound signal and vibration signal in a predetermined data format as signal data in the signal data storage unit 19.

In addition, the recording unit 17 may record as signal data the sound signal and vibration signal in accordance with the data format specified by a user via the UI. As one specific example, when a data format used in recording as data is specified by encoding the sound signal and the vibration signal, the recording unit 17, based on an encoding system corresponding to the specified data format, encodes the sound signal and vibration signal, and records the encoded sound signal and vibration signal as signal data.

1.4. Configuration of User Interface (UI)

Figure 6:
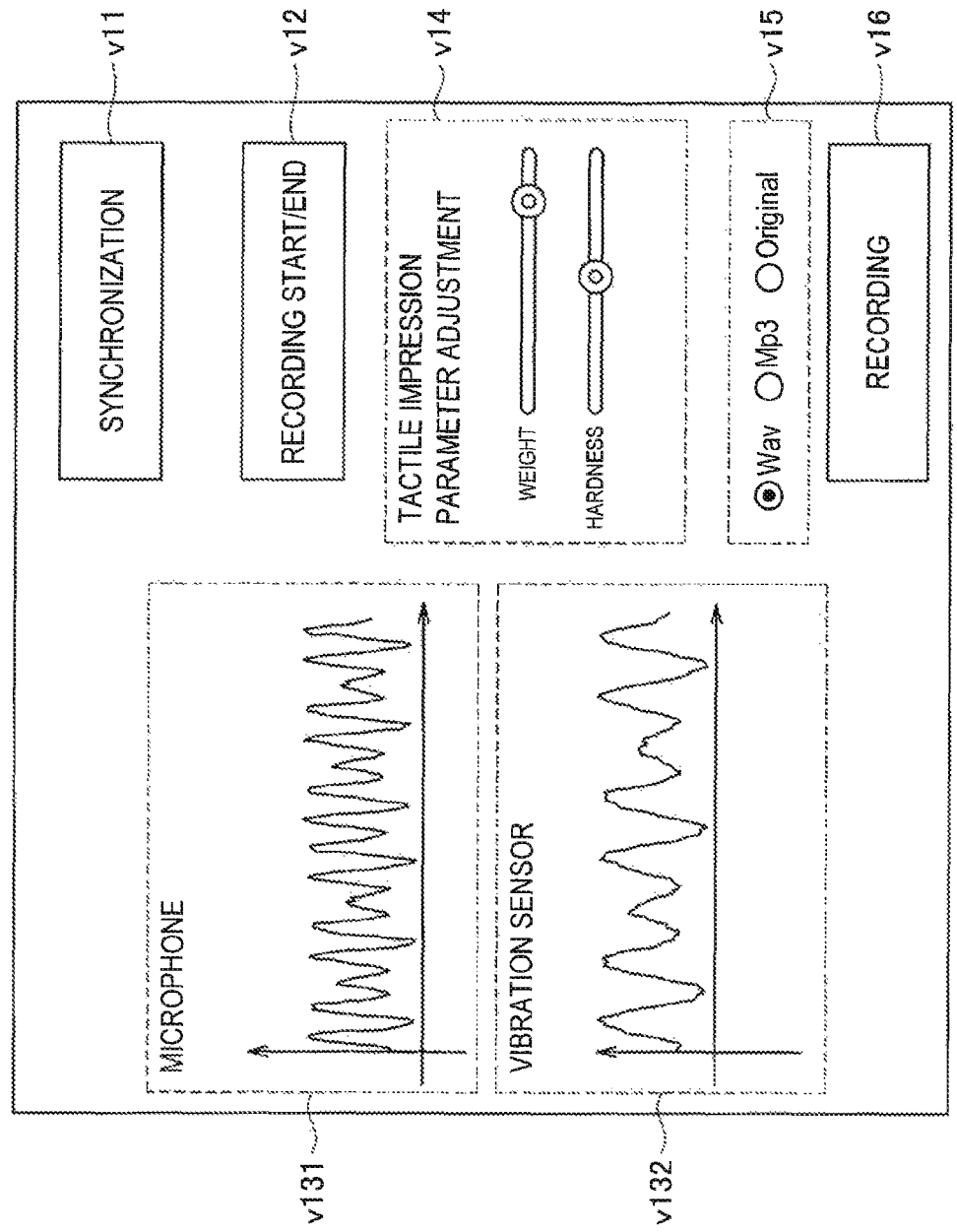
FIG. 6 is an explanatory view for describing one example of a user interface of the information processing apparatus according to the first embodiment.

Next, one example of UI according to the present embodiment will be described with reference to FIG. 6. FIG. 6 is an explanatory view for describing one example of the UI of an information processing apparatus according to the present embodiment. As indicated in FIG. 6, UI v10 according to the present embodiment includes monitoring screens v131 and v132, a synchronous button v11, a recording start/end button v12, a tactile impression parameter adjustment bar v14, a recording format specification unit v15, and recording button v16

The monitoring screen v131 is a display screen for outputting a signal waveform of the acquired sound signal as monitoring information. In the same way, the monitoring screen v132 is a display screen for outputting a signal waveform of the acquired vibration signal as monitoring information.

The UI control unit 15 may acquire information for displaying a waveform of the sound signal and vibration signal from the synchronization processing unit 131, for example, and may display a monitoring result of the sound signal and the vibration signal on monitoring screens v131 and v132, respectively, based on the acquired information.

In addition, the synchronous button v11 is an interface for a user to instruct execution of synchronization processing between the sound signal and the vibration signal to the synchronization processing unit 131. For example, the synchronization processing unit 131 may receive a notification with respect to contents of manipulation to the synchronous button v11 from the UI control unit 15, and based on the sound signal and vibration signal which are acquired within a prescribed time on the basis of a timing at which this notification has been received, may execute the synchronization processing.

The recording start/end button v12 is an interface for a user to specify a start and end timing of a signal to be recorded as signal data of the acquired sound signal and vibration signal. It becomes possible for the signal processing unit 133 or the recording unit 17 to recognize a start and end timing of a signal to be recorded as signal data while receiving a notification with respect to contents of manipulation to the recording start/end button v12. Then, the signal processing unit 133 or the recording unit 17 may recognize the sound signal and the vibration signal in a period indicated by this start and end timing as a signal of a target to be recorded.

For example, the signal processing unit 133 may output only the sound signal and vibration signal in a period indicated by the specified start and end timing to the recording unit 17 as a target to be recorded. In addition, as another example, the recording unit 17, of the sound signal and vibration signal acquired from the signal processing unit 133, may record as signal data only the sound signal and the vibration signal in a period indicated by the specified start and end timing.

The tactile impression parameter adjustment bar v14 is one example of an interface for a user to specify for the information processing apparatus 10 directly or indirectly contents of signal processing applied to the sound signal and the vibration signal.

For example, in an example illustrated in FIG. 6, the tactile impression parameter adjustment bar v14 is configured so as to be able to specify a degree of "weight" and "hardness" of a tactile impression reproduced as a tactile sense by manipulating a corresponding bar. For example, the signal processing unit 133, while receiving a notification with respect to contents of manipulation to the tactile impression parameter adjustment bar v14 from the UI control unit 15, may recognize a degree of "weight" and "hardness" specified by a user, and may adjust an amplitude of the sound signal and the vibration signal in accordance with the degree of the "weight" and "hardness".

As one specific example, a gain of the sound signal and the vibration signal is adjusted so that a gain of the vibration signal may become higher than a gain of the sound signal, and thereby, it becomes possible to present a tactile impression of "heavy" or "hard" to a user by this sound signal and vibration signal. In addition, as another example, by a gain of the sound signal and the vibration signal being adjusted so that a gain of the sound signal may become higher than a gain of the vibration signal, it becomes possible to present a tactile impression of "light" or "soft" to a user by this sound signal and vibration signal. Note that, details of the gain control with respect to the sound signal and the vibration signal will be described later separately as an example 1.

The recording format specification unit v15 is an interface for a user to specify for the information processing apparatus 10 a data format at the time of recording the sound signal and the vibration signal as signal data. It is preferred that the recording format specification unit v15 is configured as an interface in which one of a plurality of selection formats is selectable, for example. For example, in an example illustrated in FIG. 6, the recording format specification unit v15 is configured as radio buttons. In addition, in an example illustrated in FIG. 6, "WAV", "MP3" and "Original" are configured so as to be selectable as a data format for recording the sound signal and the vibration signal as signal data. Note that, "Original" is a data format unique to the information processing apparatus 10 according to the present embodiment. Including also details of a data format indicated by "Original" unique to the information processing apparatus 10 according to an embodiment, details of a relation between a data format of signal data and applied signal processing will be described later separately as an example 4.

The recording unit 17, for example, while receiving a notification with respect to contents of manipulation to the recording format specification unit v15 from the UI control unit 15, may recognize data format specified by a user based on this notification. Then, the recording unit 17 may convert the sound signal and the vibration signal into signal data in accordance with a data format specified by a user. In addition, when a data format to be recorded as data is specified by encoding the sound signal and the vibration signal, the recording unit 17 may generate signal data by encoding the sound signal and the vibration signal based on an encoding system corresponding to the specified data format.

Note that, the example of a data format illustrated in FIG. 6 is merely one example, and it is needless to say that if the sound signal and the vibration signal can be recorded as data, the data format of signal data is not limited to examples illustrated in FIG. 6.

The recording button v16 is an interface for a user to instruct the information processing apparatus 10 to record the generated signal data. The recording unit 17, while receiving a notification with respect to contents of manipulation to the recording button v16 from the UI control unit 15, may store the signal data with the sound signal and vibration signal converted in the signal data storage unit 19.

As mentioned above, one example of the UI of the information processing apparatus 10 according to the present embodiment has been described with reference to FIG. 6. Note that, the UI v10 illustrated in FIG. 6 is merely one example, and it is needless to say that configurations of the UI v10 may be changed suitably in accordance with contents of instructions which a user can specify for the information processing apparatus 10.

1.5. Processing

Figure 7:
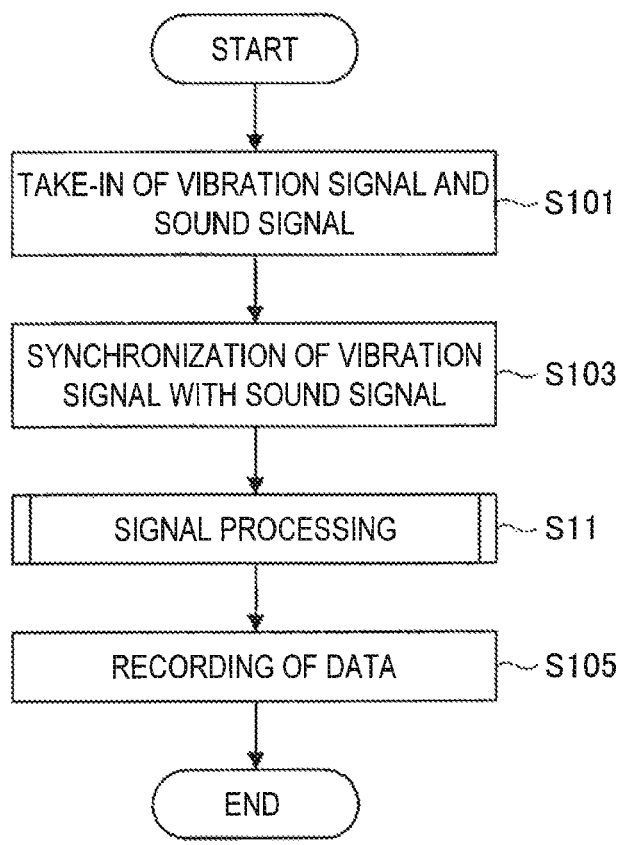
FIG. 7 is a flow chart illustrating a flow of a series of processing according to the first embodiment.

Next, with reference to FIG. 7, a series of operations of the information processing system according to the present embodiment will be described by focusing on operation of the information processing apparatus 10 in particular. FIG. 7 is a flow chart illustrating a flow of a series of processing according to the present embodiment.

(Step S101)

When the information processing apparatus 10 starts, and detecting of a vibration by the vibration sensor 31 and collecting of a sound by the microphone 33 are started, outputting of the vibration signal from the vibration sensor 31 to the information processing apparatus 10, and outputting of the sound signal from the microphone 33 to the information processing apparatus 10 are started. Hereinafter, the vibration sensor 31 detects successively a vibration of the manipulation object 70, and outputs successively a vibration signal showing the detected vibration to the information processing apparatus 10 via the propagation path n11. In the same way, the microphone 33 collects successively a sound output from the manipulation object 70, and outputs successively a sound signal showing the collected sound to the information processing apparatus 10 via the propagation path n13.

The vibration signal acquisition unit 111 acquires a vibration signal indicating a vibration of the manipulation object 70 (refer to FIG. 2) detected by the vibration sensor 31 from this vibration sensor 31 successively via the propagation path n11. The vibration signal acquisition unit 111 outputs the acquired vibration signal to the control unit 13 successively.

In the same way, the sound signal acquisition unit 113 acquires successively the sound signal indicating a sound which is output from the manipulation object 70 and collected by the microphone 33 via the propagation path n13 from this microphone 33. The sound signal acquisition unit 113 outputs successively the acquired sound signal to the control unit 13.

The synchronization processing unit 131 acquires successively the vibration signal detected by the vibration sensor 31 from the vibration signal acquisition unit 111, and acquires successively the sound signal collected by the microphone 33 from the sound signal acquisition unit 113. Then, the synchronization processing unit 131 synchronizes the acquired vibration signal with the sound signal.

For example, the synchronization processing unit 131, based on a waveform of at least a part of signal in the acquired sound signal and a waveform of at least a part of signal in the acquired vibration signal, calculates a delay amount between this sound signal and this vibration signal.

As one specific example, the synchronization processing unit 131, based on the sound signal and vibration signal which are acquired when the object 70 moves so that a position and direction of this object 70 may change abruptly, may calculate a delay amount between this sound signal and this vibration signal.

In this case, the synchronization processing unit 131, for example, based on a peak position of a waveform of each of the acquired sound signal and vibration signal, may calculate a delay amount between this sound signal and this vibration signal. In addition, besides a peak position, when, based on a waveform of each of the sound signal and the vibration signal, a delay amount between this sound signal and this vibration signal can be calculated, a method of calculating this delay amount is not limited in particular. For example, the synchronization processing unit 131, based on a position where a waveform of each of the sound signal and the vibration signal rises up, may calculate a delay amount between this sound signal and this vibration signal.

After calculating a delay amount between the sound signal and the vibration signal, the synchronization processing unit 131, by delaying at least any one of the sound signal and the vibration signal based on the calculated delay amount, synchronizes this sound signal with this vibration signal. Then, the synchronization processing unit 131 outputs the sound signal and the vibration signal which are synchronized to the signal processing unit 133.

(Step S11)

The signal processing unit 133 acquires the synchronized sound signal and vibration signal from the synchronization processing unit 131, and applies signal processing to at least any one of the acquired sound signal and vibration signal.

As one specific example, the signal processing unit 133 may control an amplitude of at least one of the synchronized sound signal and vibration signal (for example, gain or volume may be controlled). In addition, the signal processing unit 133 may generate a synthesized signal by synthesizing the synchronized sound signal and vibration signal. In addition, the signal processing unit 133, when a sampling rate differs between the synchronized sound signal and vibration signal, may convert one sampling rate in accordance with the other sampling rate.

Note that, various signal processing described above is merely one example, and contents of signal processing by the signal processing unit 133 are not limited to the above example.

In addition, it is needless to say that the signal processing unit 133 may suitably combine and execute each signal processing described above. In addition, the signal processing unit 133 may determine based on an instruction from a user which one among each signal processing described above is to be applied.

The signal processing unit 133 outputs the synchronized sound signal and vibration signal after signal processing to the recording unit 17 in association with each other.

(Step S105)

The recording unit 17 acquires the sound signal and vibration signal which are synchronized and associated with each other from the signal processing unit 133. The recording unit 17 stores the acquired sound signal and vibration signal in a predetermined data format as signal data in the signal data storage unit 19.

As mentioned above, the information processing apparatus 10 according to the present embodiment acquires the vibration signal indicating a vibration of the manipulation object 70 detected by the vibration sensor 31, and the sound signal indicating a sound which is collected by the microphone 33 and output from the manipulation object 70, and synchronizes both with each other. Then, the information processing apparatus 10 records as signal data the synchronized sound signal and vibration signal in association with each other. Based on signal data recorded in this way, by controlling vibration outputs of actuators and sound outputs from loudspeakers, it becomes possible to realize easily a tactile sense feedback based on sound outputs from a plurality of loudspeakers and vibration outputs from a plurality of actuators.

2. EXAMPLE

Next, an example of the information processing system or the information processing apparatus 10 according to an embodiment mentioned above will be described.

2.1. Example 1: Output Control 1 of Sound Signal and Vibration Signal

First, with reference to FIG. 8, an information processing system according to an example 1 will be described. In the example 1, described is an example where at the time of recoding a vibration signal output from the vibration sensor 31 and a sound signal output from the microphone 33, a tactile sense feedback presented by the bodily sensation introduction device 80 is controlled by adjusting an output of each signal. FIG. 8 is an explanatory view for describing an outline of the information processing system according to the example 1.

In the present example, in a bodily sensation introduction device having a button shape, a case where a tactile feeling which a user perceives when a button is depressed is controlled based on the tactile sense feedback will be described. In this case, a manipulation object having a button shape may be used as the manipulation object 70 illustrated in FIG. 2 as illustrated in FIG. 8, for example. Note that, hereinafter, the manipulation object according to the present example illustrated in FIG. 8, when shown in particular, may be described as a "manipulation object 70*a*."

In the information processing system according to the present example, for example, as shown in FIG. 8, the vibration sensor 31 and the microphone 33 are provided in a region corresponding to a part directly under a button portion in the bottom of the manipulation object 70*a*. Note that, at this time, the microphone 33 may be installed so that a sound-collecting unit for collecting a sound may be directed in a direction of the button portion, for example.

Here, as illustrated in a right-hand side of FIG. 8, it is assumed that a user has depressed the button portion of the manipulation object 70*a*. At this time, a vibration of the manipulation object 70*a* at the time of depressing of this button portion is detected by the vibration sensor 31, and a sound output from the manipulation object 70*a* (button portion, in particular) will be collected by the microphone 33.

As mentioned above, a vibration and a sound generated by an operation to the manipulation object 70*a* (i.e. depressing a button) are detected by the vibration sensor 31 and the microphone 33, and a vibration signal indicating this vibration and a sound signal indicating this sound are output to the information processing apparatus 10.

For example, FIG. 9 indicates one example of the vibration signal output from the vibration sensor 31 and the sound signal output from the microphone 33 in the information processing system according to the example 1. As for each graph indicated in FIG. 3, a horizontal axis indicates a time, and a vertical axis indicates an amplitude (V) of the signal, i.e., a change of a voltage value as an amplitude. The signal denoted by a reference symbol g21 indicates one example of a waveform of the sound signal output from the microphone 33, i.e., the sound signal which is output from the manipulation object 70*a* and collected by the microphone 33. In addition, the signal denoted by a reference symbol g22 indicates one example of a waveform of the vibration signal output from the vibration sensor 31, i.e., the vibration signal indicating a vibration of the manipulation object 70 detected by the vibration sensor 31.

The information processing apparatus 10 controls an amplitude by applying signal processing to at least any one of the vibration signal output from the vibration sensor 31 and the sound signal output from the microphone 33, and may record as data the vibration signal and sound signal after control in association with each other.

As one specific example, by adjusting a gain ratio between the vibration signal and the sound signal, it is possible to control a tactile feeling of a tactile sense reproduced based on the vibration signal and sound signal recorded as data.

For example, when a gain ratio between the vibration signal and the sound signal is not adjusted, that is, when each signal detected by the vibration sensor 31 and the microphone 33 is recorded as data, the same tactile feeling as at the time of recording this each signal will be reproduced based on the data.

In contrast with this, it is assumed that a gain ratio between the sound signal and the vibration signal is adjusted so that "sound signal gain:vibration signal gain=0.9:0.1" may be realized, that is, so that a gain of the sound signal may become higher than a gain of the vibration signal, for example. As for a tactile sense feedback based on the sound signal and vibration signal where a gain ratio has been adjusted in this way, a vibration output becomes smaller and a sound output becomes larger as compared with a case where a gain ratio of the sound signal and the vibration signal is not adjusted. In other words, by a gain ratio being adjusted so that a gain of the sound signal may become higher than a gain of the vibration signal, it becomes possible for the bodily sensation introduction device 80 to feed back to a user a tactile sense having a lighter tactile feeling as compared with a case where a gain ratio is not adjusted, based on this sound signal and vibration signal.

As another example, it is assumed that a gain ratio between the sound signal and the vibration signal is adjusted so that "sound signal gain:vibration signal gain=0.1:0.9" may be realized, that is, so that a gain of the vibration signal may become higher than a gain of the sound signal, for example. As for a tactile sense feedback based on the sound signal and vibration signal where a gain ratio has been adjusted in this way, a vibration output becomes larger and a sound output becomes smaller as compared with a case where a gain ratio of the sound signal and the vibration signal is not adjusted. In other words, by a gain ratio being adjusted so that a gain of the vibration signal may become higher than a gain of the sound signal, it becomes possible for the bodily sensation introduction device 80 to feed back to a user a tactile sense having a heavier tactile feeling as compared with a case where a gain ratio is not adjusted, based on this sound signal and vibration signal.

As mentioned above, as described as the example 1, the information processing apparatus 10 according to the present embodiment may control a gain by applying signal processing to at least any one of the vibration signal output from the vibration sensor 31 and the sound signal output from the microphone 33. In this way, by adjusting a gain of the vibration signal and the sound signal, it becomes also possible to reproduce a tactile sense of a tactile feeling different from a tactile feeling at the time of manipulating of the manipulation object 70a in a pseudo manner, and to feed it back to a user. Note that, although an example of a case where the information processing apparatus 10 controls a gain of the sound signal and the vibration signal has been described in an example illustrated above, it is needless to say that the bodily sensation introduction device 80 side may perform this gain control.

2.2. Example 2: Output Control 2 of Sound Signal and Vibration Signal

Next, operation of the information processing apparatus 10 according to an example 2 will be described. The information processing apparatus 10 according to the present example, in a frequency band where the vibration signal detected by the vibration sensor 31 and the sound signal collected by the microphone 33 are overlapped with each other, controls an output of at least any one of the signals.

As one specific example, in a frequency band where the sound output and the vibration output are overlapped with each other, a user may perceive the vibration output as a sound. Therefore, a user, due to a tactile sense feedback (vibration output) from an actuator, may perceive a sound in a frequency band where the sound output and the vibration output are overlapped with each other within a sound output from a loudspeaker, in such a way as the output has been increased as compared with a sound in other frequency bands. While such a situation is assumed, in the information processing apparatus 10 according to the present example, in a frequency band where the vibration signal detected by the vibration sensor 31 and the sound signal collected by the microphone 33 are overlapped with each other, an amplitude of at least any one of the outputs may be restricted.

Figure 10:
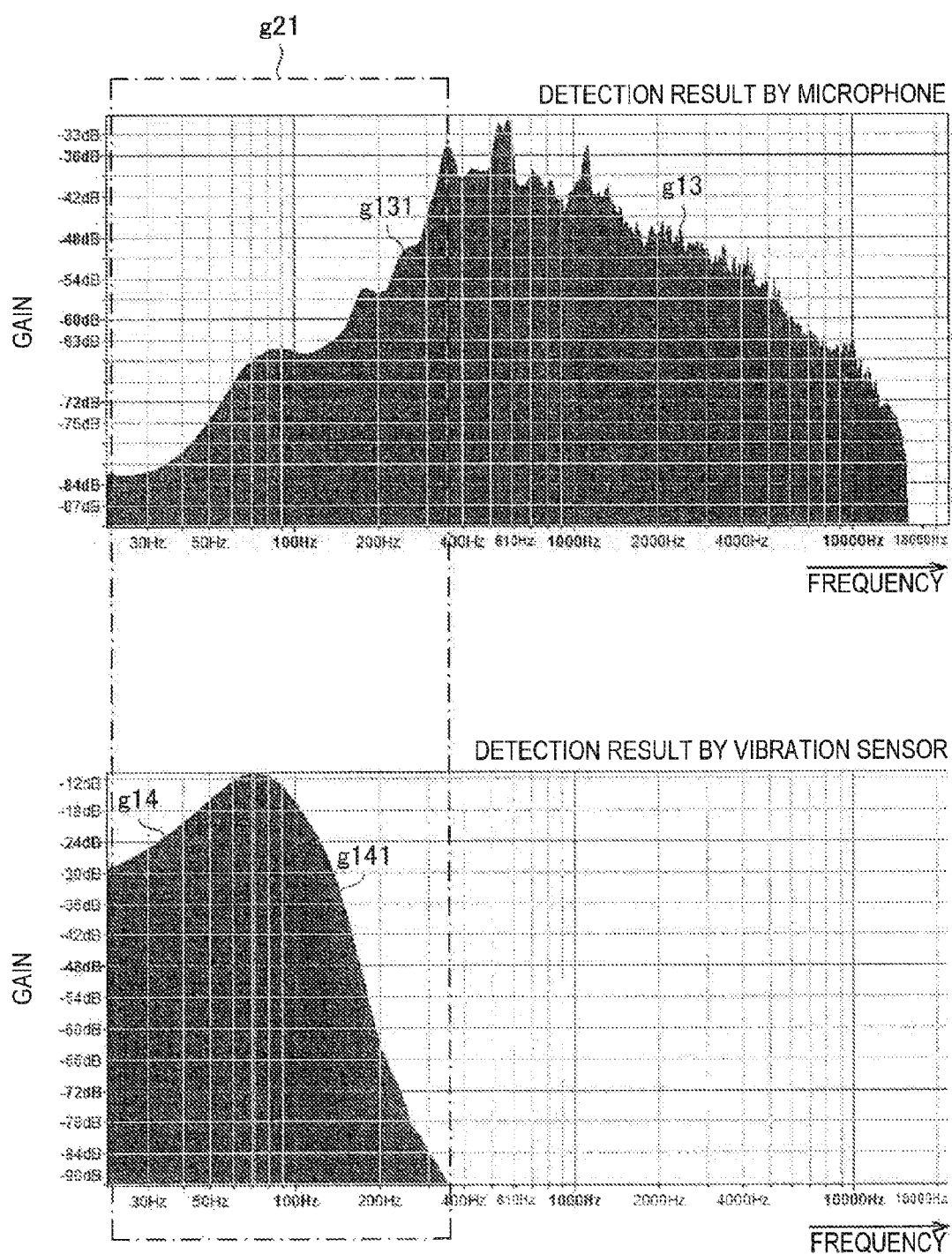
FIG. 10 is an explanatory view for describing an outline of the information processing system according to an example 2.

For example, FIG. 10 is an explanatory view for describing an outline of the information processing apparatus 10 according to the present example, and indicates one example of a distribution of frequency components at a certain timing of each of the acquired sound signal and vibration signal. As for each graph indicated in FIG. 10, a horizontal axis indicates a frequency, and a vertical axis indicates an amplitude (V) of the signal, i.e., a change of a voltage value as an amplitude. A signal denoted by a reference symbol g13 illustrates a frequency distribution of the sound signal output from the microphone 33. In the same way, a signal denoted by a reference symbol g14 illustrates a frequency distribution of the vibration signal output from the vibration sensor 31.

In an example indicated in FIG. 10, the sound signal denoted by a reference symbol g131 and the vibration signal denoted by a reference symbol g141 are overlapped with each other in a frequency band denoted by the reference symbol g21. In this case, in the frequency band denoted by the reference symbol g21, the sound signal g131 and the vibration signal g141 are overlapped with each other, and a user will perceive the sound in this frequency band g21 in such a way as the output has been increased as compared with a sound in other frequency bands.

Therefore, the signal processing unit 133 of the information processing apparatus 10 according to the present example, in a frequency band where the vibration signal detected by the vibration sensor 31 and the sound signal collected by the microphone 33 are overlapped with each other, may restrict an amplitude of at least any one of the outputs. As one specific example, the signal processing unit 133, while having determined an output ratio between the sound signal and the vibration signal in advance, may determine an attenuation amount in which each of the sound signal and the vibration signal is attenuated in accordance with this output ratio. For example, when an output ratio between the sound signal and the vibration signal has been determined to be 1:1, the signal processing unit 133 may attenuate an amplitude of each of the sound signal and the vibration signal into one half. In addition, as another example, when an output ratio between the sound signal and the vibration signal has been determined to be 2:1, the signal processing unit 133 may attenuate an amplitude of the sound signal into two thirds, and may attenuate an amplitude of the vibration signal into one third.

In addition, as another example, the signal processing unit 133 may perform weighting based on a ratio between an amplitude of the vibration signal detected by the vibration sensor 31 and an amplitude of the sound signal collected by the microphone 33, and may attenuate an amplitude of the sound output and the vibration output in accordance with this weighting.

As mentioned above, as described as the example 2, the information processing apparatus 10 according to the present embodiment, in a frequency band where the vibration signal detected by the vibration sensor 31 and the sound signal collected by the microphone 33 are overlapped with each other, may control an amplitude of at least any one of the signals. With such a configuration, for example, it becomes possible to prevent such a situation as a user perceives the vibration output as a sound, and perceives a sound in a frequency band where the sound output and the vibration output are overlapped with each other in such a way as the output has been increased as compared with the sound in other frequency bands

Figure 11:
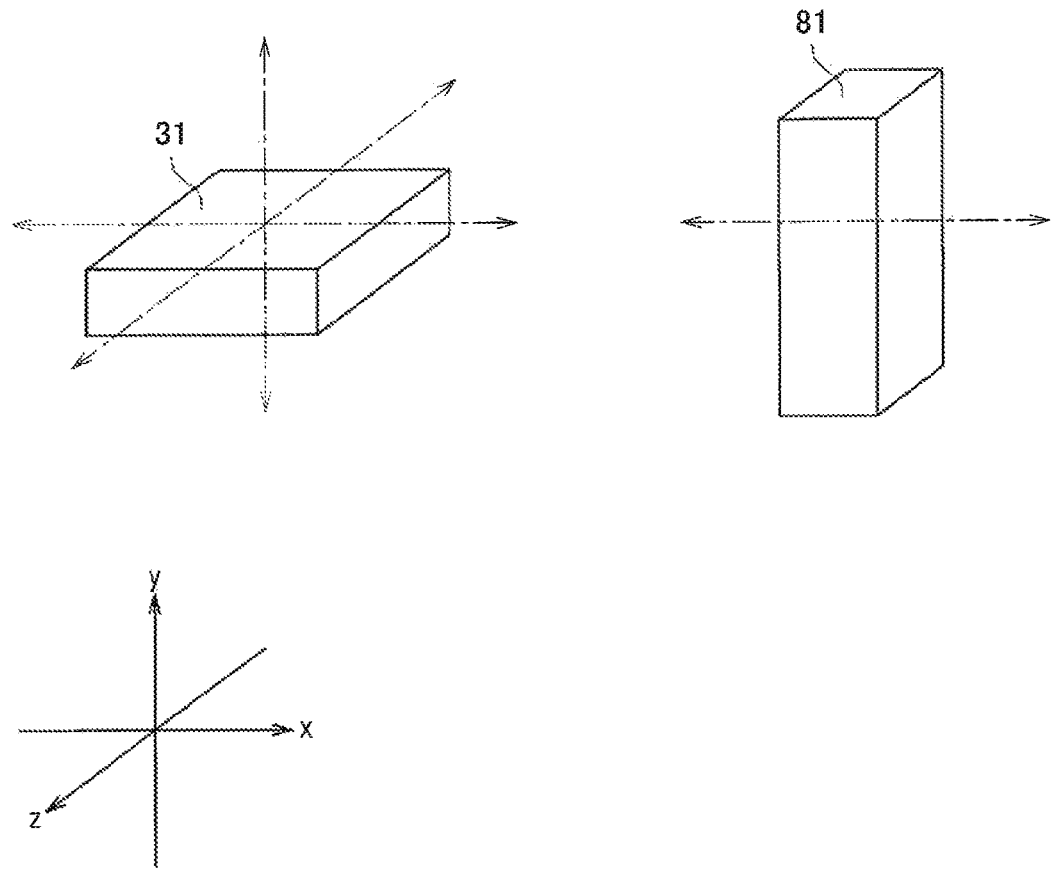
FIG. 11 is an explanatory view for describing an outline of the information processing system according to an example 3.

2.3. Example 3: Output Control 3 in a Case where Dimensions of Vibration Output Differ Next, as an example 3, operation of the information processing apparatus 10 in a case where a dimension of a direction of a vibration which the vibration sensor 31 detects and a dimension of a direction where an actuator of the bodily sensation introduction device 80 vibrates are different from each other will be described with reference to FIG. 11. FIG. 11 is an explanatory view for describing an outline of an information processing apparatus according to the example 3.

In FIG. 11, a reference symbol 31 denotes one example of the vibration sensor 31 mentioned above based on FIG. 2, i.e., the vibration sensor which detects a vibration of the manipulation object 70. In addition, a reference symbol 81 denotes one example of an actuator which is built-in in the bodily sensation introduction device 80, and feeds back a tactile sense to a user by vibrating.

Note that, in this description, as illustrated in FIG. 11, it is assumed that the vibration sensor 31 is configured so as to be able to detect a vibration as each vibration component along each direction of the x-direction, y-direction and z-direction which are orthogonal to each other. In addition, it is assumed that an actuator 81 is configured so as to be able to vibrate only along any one direction (here, x-direction) among the x-direction, y-direction and z-direction which are orthogonal to each other.

In this case, the signal processing unit 133 (refer to FIG. 5) of the information processing apparatus 10, for example, on the basis of a vibration signal (that is, vibration signal including vibration components in a plurality of directions) acquired from the vibration sensor 31, may generate a vibration signal which indicates a vibration of the actuator 81 (that is, vibration signal which vibrates only in one direction).

Specifically, the signal processing unit 133 acquires information of the actuator 81 (that is, information with respect to the direction in which vibration is possible) in advance based on a user input, for example. Thereby, the signal processing unit 133 recognizes that the actuator 81 is configured so as to be able to vibrate only in the x-direction, for example.

Then, the signal processing unit 133 converts a vibration signal having each of vibration components of the x-direction, y-direction and z-direction which have been acquired from the vibration sensor 31 into a vibration signal which vibrates only in the x-direction in accordance with the dimension of a vibration direction of the actuator 81.

As one specific example, the signal processing unit 133 may extract only a vibration component in the x-direction among each of vibration components included in the vibration signal acquired from the vibration sensor 31, and may associate as the vibration signal the extracted vibration component in the x-direction with the sound signal collected by the microphone 33.

In addition, as another example, the signal processing unit 133, by a vector operation based on each of vibration components in the x-direction, y-direction and z-direction which are acquired from the vibration sensor 31, may determine an amplitude (for example, volume) of an output of the vibration signal which indicates the vibration of the actuator 81.

As one specific example, each amplitude of vibration components in the x-direction, y-direction and z-direction which are indicated by the vibration signal acquired from the vibration sensor 31 is assumed to be Vx, Vy and Vz, respectively. In this case, the signal processing unit 133 may determine an amplitude V of the vibration signal which indicates a vibration of the actuator 81 based on Formula 1 indicated below, for example.

$$V = \sqrt{Vx^2 + Vy^2 + Vz^2}$$ (Formula 1)

Note that, the above is merely one example, and in a case where the dimension in the vibration direction which the vibration signal acquired from the vibration sensor 31 indicates is larger than the dimension in a direction in which the actuator 81 of the bodily sensation introduction device 80 can vibrate, a method of calculating an amplitude of a vibration of the actuator 81 is not limited in particular. For example, the signal processing unit 133, based on an average value or intermediate value of an amplitude of each of vibration components in the x-direction, y-direction and z-direction which are indicated by the vibration signal acquired from the vibration sensor 31, may determine an amplitude of the vibration signal which indicates a vibration of the actuator 81.

In particular, when a voice coil motor in which a loudspeaker and an actuator are constituted integrally is used as a device for the bodily sensation introduction device 80 to feed back a tactile sense, this voice coil motor is sometimes configured so as to be able to vibrate only in one direction. Even in such a situation, according to the information processing apparatus 10 according to the present example, it becomes possible to generate signal data for driving the voice coil motor for feeding back a tactile sense in accordance with the configuration of this bodily sensation introduction device 80.

In addition, the signal processing unit 133 may generate vibration signals for driving a plurality of actuators 81 which are different from each other from the vibration signal including vibration components in a plurality of directions. As one specific example, the signal processing unit 133 may extract each vibration component separately from the vibration signal including vibration components in the x-direction, y-direction and z-direction, and may use the extracted each vibration component as the vibration signal for driving actuators 81 which are different from each other. In this case, the signal processing unit 133 will generate a vibration signal vibrating in the x-direction, a vibration signal vibrating in the y-direction, and a vibration signal vibrating in the z-direction from the vibration signal including vibration components in the x-direction, y-direction and z-direction. As a matter of course, it is needless to say that the signal processing unit 133 may generate the vibration signal based on only a part among vibration components in the x-direction, y-direction and z-direction (for example, x-direction and z-direction).

2.4. Example 4: Relation Between Data Format of Signal Data and Signal Processing Next, as an example 4, one example of a relation between a data format for recording the sound signal and the vibration signal as signal data and signal processing applied to this sound signal and this vibration signal will be described.

As mentioned above, the information processing apparatus 10 according to the present embodiment records as signal data the vibration signal which indicates a vibration of the manipulation object 70 (refer to FIG. 2), and the sound signal which indicates a sound output from this manipulation object 70 in association with each other. On the other hand, depending on a data format of signal data, it may be difficult to record the acquired vibration signal and sound signal in a form as they are.

For example, restrictions with respect to a difference in the above-mentioned sampling rate between the sound signal and the vibration signal are included as the example. Specifically, in the case of a data format in which information of each signal is recorded by sample units along a time series, it may be difficult to record the sound signal and vibration signal which are different from each other in a sampling rate while maintaining a synchronized state thereof. Therefore, when this data format is selected, the signal processing unit 133 of the information processing apparatus 10 converts a sampling rate of one of the sound signal and the vibration signal in accordance with a sampling rate of the other signal.

Then, in the present example, one example of a data format for recording the sound signal and the vibration signal as signal data and one example of signal processing in accordance with this data format will be described below.

<<2.4.1. Case where Sound Signal and Vibration Signal are Recorded as Separate Data>>

Figure 12:
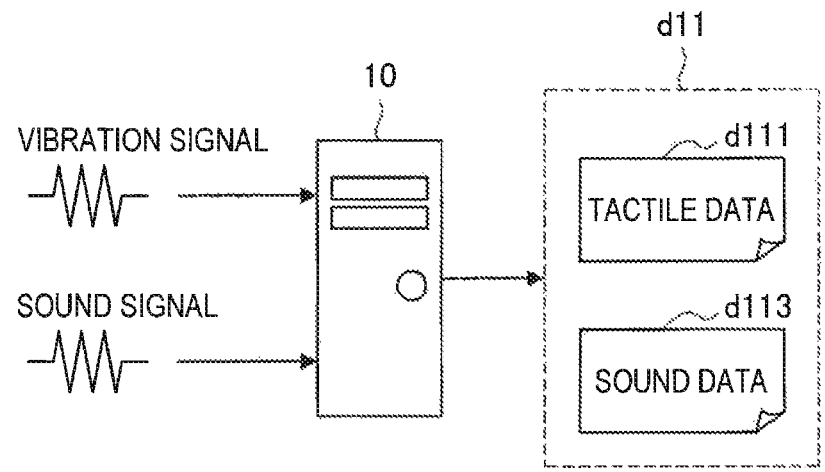
FIG. 12 is an explanatory view for describing one aspect of the information processing apparatus according to an example 4.

First, with reference to FIG. 12, one example where the sound signal and the vibration signal are recorded as mutually different and separate data will be described. FIG. 12 is an explanatory view for describing one aspect of the information processing apparatus according to the present example, and illustrates schematically a case where each of the sound signal and the vibration signal is recorded as mutually different and separate data.

In an example illustrated in FIG. 12, the information processing apparatus 10 converts the acquired vibration signal into tactile data d111, and converts the sound signal into sound data d113. As a data format of the tactile data d111 and the sound data d113, a data format in which the vibration signal and the sound signal can be recorded is preferred, and "WAV" and "MP3", etc. are included, for example.

Note that, the vibration signal may include vibration components which indicate vibrations along a plurality of different directions, and depending on a data format of the tactile data d111, there may be a case where it may be difficult to record a plurality of vibration components as a set of data (file). In such a case, the information processing apparatus 10 may generate the tactile data d111 for every vibration component, for example. In addition, as another example, as described in the example 3, another vibration signal which vibrates only in one direction is generated based on a plurality of vibration components, and this another vibration signal may be converted into the tactile data d111.

In addition, when a plurality of actuators of the bodily sensation introduction device 80 reproducing a vibration exist, the information processing apparatus 10 may generate the tactile data d111 for each of the actuators. In addition, at this time, it is needless to say that the information processing apparatus 10, in accordance with a configuration of the actuator (that is, direction in which vibration is possible), based on the acquired vibration signal may generate another vibration signal in which the dimension of the vibration direction coincides in accordance with this actuator, and may record this another vibration signal as the tactile data d111.

In addition, the information processing apparatus 10 may apply signal processing to at least one of the vibration signal and the sound signal, and may convert the vibration signal and sound signal after signal processing into the tactile data d111 and the sound data d113.

As one specific example, the information processing apparatus 10 may extract only a low frequency component no more than a prescribed frequency by applying a low pass filter to the vibration signal, and may convert the extracted low frequency component into the tactile data d111. In the same way, the information processing apparatus 10 may extract only a high frequency component no less than a prescribed frequency by applying a high pass filter to the sound signal, and may convert the extracted high frequency component into the sound data d113.

Note that, the above-mentioned signal processing with respect to the vibration signal and sound signal is merely one example, and it is needless to say that the signal processing described in the above-mentioned embodiments and each of the examples may be applied, for example.

Then, the information processing apparatus 10 records the tactile data d111 based on the vibration signal and the sound data d113 based on the sound signal as the signal data d111 associated with each other.

Note that, a method of associating the tactile data d111 with the sound data d113 is not limited in particular. As one specific example, the information processing apparatus 10, by providing a control file which indicates a relation between the tactile data d111 and the sound data d113, may associate the tactile data d111 and the sound data d113 with each other by this control file. In addition, as another example, by using common information as control information (for example, file name and information written in a header in a file) of the tactile data d111 and sound data d113 which are associated with each other, the tactile data d111 may be associated with the sound data d113.

<<2.4.2. Case where Sound Signal and Vibration Signal are Synthesized and Recorded>>

Figure 13:
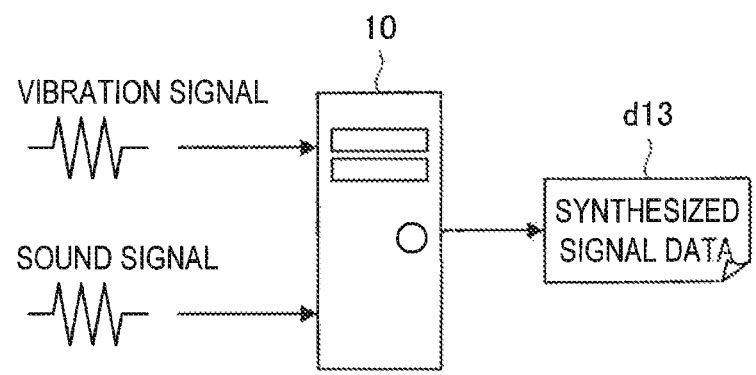
FIG. 13 is an explanatory view for describing one aspect of the information processing apparatus according to an example 4.

Next, with reference to FIG. 13, one example in a case where the sound signal and the vibration signal are recorded as a set of signal data, that is, a synthesized signal with the sound signal and vibration signal synthesized is recorded as signal data will be described. FIG. 13 is an explanatory view for describing an aspect of the information processing apparatus according to the present example, and illustrates schematically a case where a synthesized signal with the sound signal and vibration signal synthesized is recorded as signal data.

In an example illustrated in FIG. 13, the information processing apparatus 10 generates a synthesized signal by synthesizing the acquired vibration signal and sound signal, and converts the generated synthesized signal into synthesized signal data d13, and records the synthesized signal data d13 as signal data. Note that, as a data format of the synthesized signal data d13, a data format in which the vibration signal and the sound signal can be recorded in the same way as the tactile data d111 and sound data d113 which are illustrated in FIG. 12 is preferred, and "WAV", "MP3", etc. are included, for example.

Note that, when the vibration signal includes vibration components which indicate vibrations along a plurality of different directions, the information processing apparatus 10, as described in the example 3, may generate a vibration signal which vibrates in any one direction based on the plurality of vibration components, and may synthesize the generated vibration signal with the sound signal.

In addition, as mentioned above, the information processing apparatus 10, when synthesizing the vibration signal and the sound signal, may apply a filter to each signal. As one specific example, the information processing apparatus 10 extracts a low frequency component by applying a low pass filter to the vibration signal, and extracts a high frequency component by applying a high pass filter to the sound signal. Then, the information processing apparatus 10, by synthesizing the low frequency component of the extracted vibration signal and the high frequency component of the sound signal, may generate the synthesized signal.

The synthesized signal data d13 generated as mentioned above can also drive without the data being processed a device such as a voice coil motor where a loudspeaker and an actuator are constituted integrally, for example.

<<2.4.3. Case where Sound Signal and Vibration Signal are Encoded and Recorded>>

Figures 14, 15:
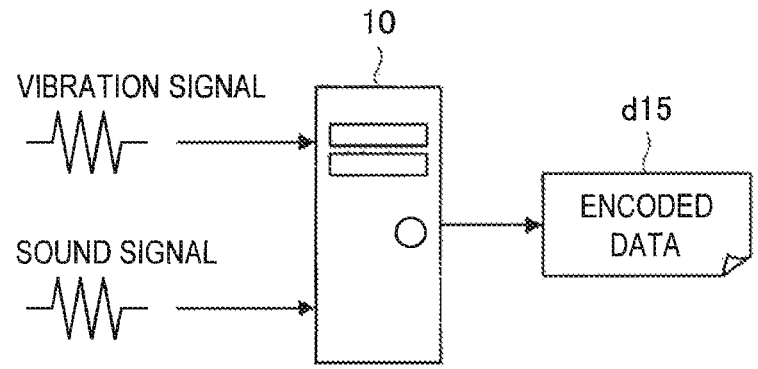
FIG. 14 is an explanatory view for describing one aspect of the information processing apparatus according to an example 4.
FIG. 15 illustrates one example of a data structure of encoded data.

Next, with reference to FIG. 14, one example in a case where the sound signal and the vibration signal are encoded (encoding) and recorded as signal data will be described. FIG. 14 is an explanatory view for describing an aspect of the information processing apparatus according to the present example, and illustrates schematically the case where the sound signal and the vibration signal are encoded and recorded as signal data. Note that, in this description, as one example in a case where the sound signal and the vibration signal are encoded, a data format which is mentioned above and unique to the information processing apparatus 10 according to the present embodiment (that is, data format illustrated as "Original" in FIG. 6) will be described.

In an example illustrated in FIG. 14, the information processing apparatus 10, by encoding the acquired vibration signal and sound signal into encoded data d15 of a unique data format, records this vibration signal and this sound signal as a set of data (file).

For example, FIG. 15 illustrates one example of a data structure of encoded data. Note that, hereinafter, when the encoded data illustrated in FIG. 15 is indicated in particular, the encoded data may be referred to as "encoded data d20".

As illustrated in FIG. 15, the encoded data d20 includes time (Time) information d21 denoting a position (that is, time) along a time series, sound (Audio) information d23 denoting a sound signal, and vibration (Tactile) information d25 denoting a vibration signal. In addition, the example illustrated in FIG. 15 illustrates a case where a vibration signal includes vibration components along the x-direction, y-direction and z-direction which are different from each other. Therefore, the encoded data d20 includes, as the vibration information d25, vibration information d251 in the x-direction, vibration information d253 in the y-direction, and vibration information d255 in the z-direction.

Each of the sound information d23, the vibration information d251, d253 and d255 denotes an amplitude of each signal. That is, the encoded data d20 illustrated in FIG. 15 is configured by arranging along a time series information which indicates an amplitude of a sound signal and information which indicates an amplitude of each vibration component (that is, a vibration component in the x-direction, y-direction and z-direction) included in the vibration signal.

By recording as signal data the encoded data d20 configured as indicated in FIG. 15, it becomes possible to reconfigure the sound signal and the vibration signal by decoding this encoded data d20. That is, it becomes possible for the bodily sensation introduction device 80 to output a sound from the loudspeaker based on a sound signal decoded from the encoded data d20, and to vibrate the actuator in synchronization with this sound output based on the decoded vibration signal.

Note that, as encoded data, a plurality of sound signals and a plurality of vibration signals may be able to be recorded. For example, FIG. 16 illustrates one example of a data structure of the encoded data, and illustrates one example in a case where a plurality of sound signals and a plurality of vibration signals are recorded as a set of data (file). Note that, hereinafter, when the encoded data illustrated in FIG. 16 is indicated in particular, the encoded data may be referred to as "encoded data d30".

The encoded data d30 illustrates a case where recorded are a sound signal to be output from each of loudspeakers R (right-hand side) and L (left-hand side) provided in a right and left of a casing of the bodily sensation introduction device 80, and a vibration signal for driving actuators 81R (right-hand side) and 81L (left-hand side) provided in a right and left of the casing.

As illustrated in FIG. 16, the encoded data d30 includes time information d31, sound information d331 and d333, and vibration information d35 and d37. In addition, an example illustrated in FIG. 16 illustrates a case where a vibration signal corresponding to each of the vibration information d35 and d37 includes vibration components along an x-direction, y-direction and z-direction which are different from each other. Therefore, the encoded data d30, as the vibration information d35, includes vibration information d351 in the x-direction, vibration information d353 in the y-direction and vibration information d355 in the z-direction. In the same way, the encoded data d30, as the vibration information d37, includes vibration information d371 in the x-direction, vibration information d373 in the y-direction and vibration information d375 in the z-direction.

Each of the sound information d331 and d333, the vibration information d351, d353, d355, d371, d373, and d375 denotes an amplitude of each signal. That is, the encoded data d30 illustrated in FIG. 16 is configured by arranging along a time series information which indicates amplitudes of a plurality of sound signals and information which indicates an amplitude of each vibration component (that is, a vibration component in the x-direction, y-direction and z-direction) included in each of the plurality of vibration signals.

By recording as signal data the encoded data d20 configured as indicated in FIG. 16, it becomes possible to reconfigure the plurality of sound signals and the plurality of vibration signals by decoding this encoded data d30. That is, it becomes possible for the bodily sensation introduction device 80 to output sounds from the plurality of loudspeakers R and L based on a plurality of sound signals decoded from the encoded data d30, and to vibrate the plurality of actuators 81R and 81L in synchronization with this sound output based on the decoded vibration signals.

3. HARDWARE CONFIGURATION

Figure 17:
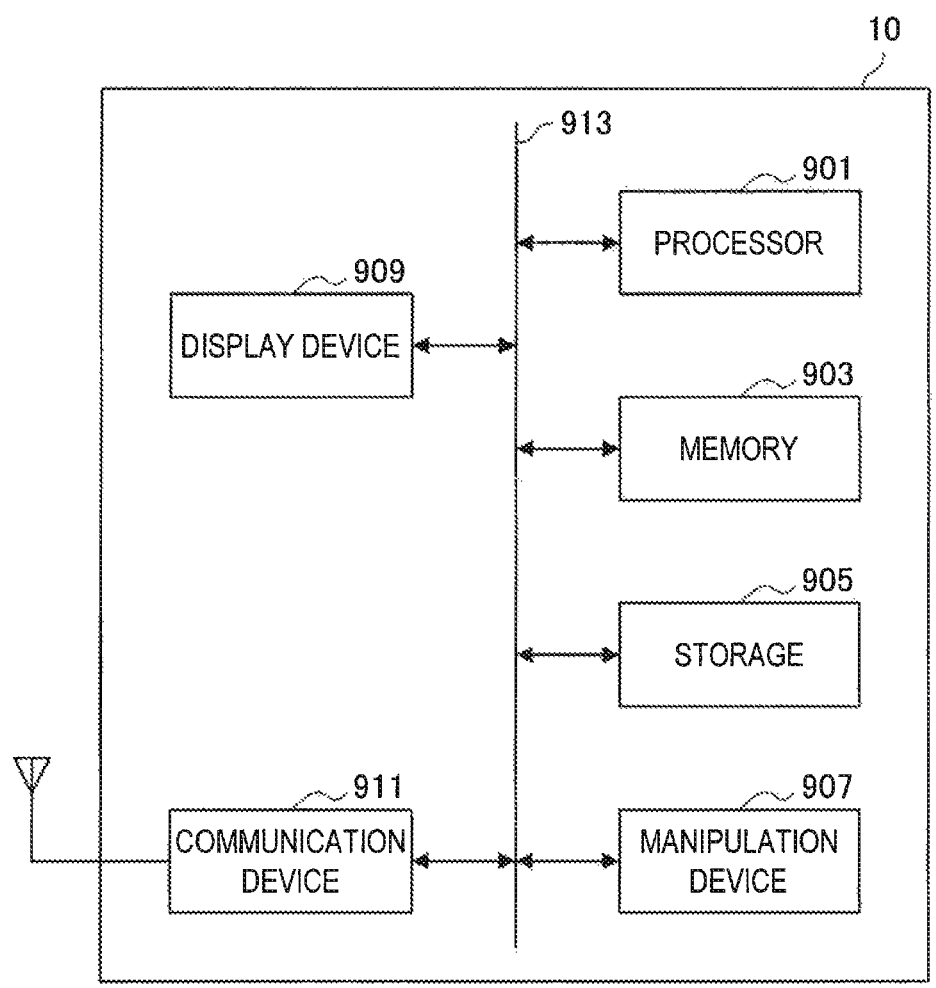
FIG. 17 illustrates one example of a hardware configuration of the information processing apparatus according to the first embodiment.

Next, description will be made of one example of the hardware configuration of the information processing apparatus 10 according to the present embodiment of the present disclosure, with reference to FIG. 17. FIG. 17 is a diagram illustrating one example of the hardware configuration of the information processing apparatus 10 according to the present embodiment.

As illustrated in FIG. 17, the information processing apparatus 10 according to the present embodiment includes a processor 901, a memory 903, a storage 905, a manipulation device 907, a display device 909, a communication device 911, and a bus 913.

The processor 901 may be, for example, a central processing unit (CPU), a graphics processing unit (GPU), a digital signal processor (DSP) or a system on chip (SoC), and executes various processings of the information processing apparatus 10. The processor 901 may be configured by an electronic circuit for executing various types of arithmetic processings, for example. Note that the aforementioned control unit 13, the UI control unit 15, and the recoding unit 17 may be configured by the processor 901.

The memory 903 includes a random access memory (RAM) and a read only memory (ROM), and stores programs and data executed by the processor 901. The storage 905 may include a memory medium such as a semiconductor memory and a hard disk. For example, the signal data storage unit 19 mentioned above may be configured by at least any one of a memory 903 and a storage 905, or a combination of both.

The manipulation device 907 has the function to generate the input signal for the user to perform a desired manipulation. The manipulation device 907 may be configured by an input unit, such as for example a button, a switch, and the like, for the user to input information, an input control circuit for generating the input signal on the basis of the input by the user and supplying the input signal to the processor 901, and the like.

The display device 909 is one example of the output device, and may be a display device such as a liquid crystal display (LCD) device, and an organic light emitting diode (OLED) display device. The display device 913 can provide information by displaying frames to the user. Note that, the display 50 mentioned above may be configured as this display device 909, and the display device 909 may be provided separately from the display 50.

The communication device 911 is a communication mechanism which is included in the information processing apparatus 10, and communicates with external devices via a network. The communication device 911 is an interface for wired or wireless communication. When the communication device 911 is configured to be as a wireless communication interface, the communication device 911 may include a communication antenna, a radio frequency (RF) circuit, a baseband processor, and others.

The communication device 911 has the function to execute various types of signal processings to the signal received from the external device, and is capable of supplying the digital signal generated from the received analog signal to the processor 901.

The bus 913 connects the processor 901, the memory 903, the storage 905, the manipulation device 907, the display device 909, and the communication device 911 with each other. The bus 913 may include a plurality of types of buses.

Also, a program for causing the hardware such as the processor, the memory and the storage built in a computer to perform the function equivalent to the configuration of the information processing apparatus 10 described above is also producible. Also, a computer-readable memory medium recording the program can also be provided.

4. CONCLUSION

The data recorded in this way can be used for a feedback of a tactile sense by the bodily sensation introduction device 80.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
an acquisition unit configured to acquire a vibration signal that indicates a detected vibration of a prescribed real object and a sound signal that indicates a collected sound from the real object;
a control unit configured to synchronize the acquired vibration signal with the acquired sound signal, and associate the vibration signal and the sound signal with each other, the vibration signal and the sound signal having been synchronized; and
a recoding unit configured to record the vibration signal and the sound signal which have been associated with each other.

(2) The information processing apparatus according to (1),
wherein the control unit controls an amplitude of at least any one of the vibration signal and the sound signal which are synchronized (3) The information processing apparatus according to (2).
wherein the control unit restricts an amplitude of at least one of the vibration signal and the sound signal in a frequency band in which the vibration signal and the sound signal which have been synchronized are overlapped.

(4) The information processing apparatus according to any one of (1) to (3),
wherein the acquisition unit acquires the vibration signal having vibration components in a plurality of directions different from each other, and
wherein the control unit, based on at least a part of vibration components among a plurality of the vibration components that the acquired vibration signal has, generates another vibration signal having the vibration components smaller in number than the number of the vibration components that the vibration signal has, and synchronizes the another vibration signal with the acquired sound signal.

(5) The information processing apparatus according to (4),
wherein the control unit generates the another vibration signal having the part of vibration components.

(6) The information processing apparatus according to (4),
wherein the control unit determines amplitudes of the vibration components that the another vibration signal has, in accordance with a result of a vector operation based on the plurality of vibration components that the acquired vibration signal has.

(7) The information processing apparatus according to any one of (1) to (6),
wherein the control unit associates the vibration signal with the sound signal by synthesizing the vibration signal and the sound signal which have been synchronized, and
wherein the recoding unit records a synthesized signal in which the vibration signal and the sound signal have been synthesized.

(8) The information processing apparatus according to (7),
wherein the control unit generates the synthesized signal by synthesizing a low frequency component of the vibration signal equal to or lower than a first threshold value and a high frequency component of the sound signal equal to or higher than a second threshold value.

(9) The information processing apparatus according to (8),
wherein the first threshold value is set to a frequency higher than the second threshold value.

(10) The information processing apparatus according to any one of (1) to (7),
wherein the control unit determines whether to synthesize the vibration signal and the sound signal in accordance with a recording format for recording the vibration signal and the sound signal which have been synchronized.

(11) The information processing apparatus according to any one of (1) to (6),
wherein the control unit encodes the vibration signal and the sound signal which have been synchronized in accordance with a recording format for recording the vibration signal and the sound signal, and
wherein the recoding unit records the vibration signal and the sound signal which have been encoded.

(12) The information processing apparatus according to any one of (1) to (11),
wherein the control unit synchronizes the vibration signal with the sound signal based on a waveform of at least a part of signal in the vibration signal, and a waveform of at least a part of signal in the sound signal.
(13) The information processing apparatus according to (12),
wherein the control unit synchronizes the vibration signal with the sound signal based on a waveform of the vibration signal and a waveform of the sound signal which are acquired in accordance with prescribed movement of the real object.
(14) The information processing apparatus according to any one of (1) to (13),
wherein the control unit converts, in accordance with a sampling rate of one signal of the vibration signal and the sound signal which have been synchronized, a sampling rate of the other signal, and associates the other signal, in which a sampling rate has been converted, with the one signal.
(15) The information processing apparatus according to (14),
wherein the control unit converts a sampling rate of the other signal in accordance with the one signal of the vibration signal and the sound signal which have been synchronized, in which a sampling rate is high.
(16) The information processing apparatus according to (15),
wherein the one signal is the sound signal, and
wherein the other signal is the vibration signal.
(17) An information processing method including:
acquiring a vibration signal that indicates a detected vibration of a prescribed real object, and a sound signal that indicates a collected sound from the real object;
synchronizing, by a processor, the acquired vibration signal with the acquired sound signal, and associating the vibration signal and the sound signal with each other, the vibration signal and the sound signal having been synchronized; and
recording the vibration signal and the sound signal which have been associated with each other.
(18) A program for causing a computer to execute:
acquiring a vibration signal that indicates a detected vibration of a prescribed real object, and a sound signal that indicates a collected sound from the real object;
synchronizing the acquired vibration signal with the acquired sound signal, and associating the vibration signal and the sound signal with each other, the vibration signal and the sound signal having been synchronized; and
recording the vibration signal and the sound signal which have been associated with each other.

What is claimed is:
1. An information processing apparatus comprising:
an acquisition unit configured to acquire successively a vibration signal that indicates a detected vibration of a prescribed real object and a sound signal that indicates a collected sound from the real object;
a control unit configured to synchronize the acquired vibration signal with the acquired sound signal, and associate the vibration signal and the sound signal with each other, the vibration signal and the sound signal having been synchronized; and
a recording unit configured to record the vibration signal and the sound signal which have been associated with each other,
wherein the acquisition unit, the control unit, and the recording unit are each implemented via at least one processor.
2. The information processing apparatus according to claim 1,
wherein the control unit controls an amplitude of at least any one of the vibration signal and the sound signal which are synchronized.
3. The information processing apparatus according to claim 2,
wherein the control unit restricts an amplitude of at least one of the vibration signal and the sound signal in a frequency band in which the vibration signal and the sound signal which have been synchronized are overlapped.
4. The information processing apparatus according to claim 1,
wherein the acquisition unit acquires the vibration signal having vibration components in a plurality of directions different from each other, and
wherein the control unit, based on at least a part of vibration components among a plurality of the vibration components that the acquired vibration signal has, generates another vibration signal having the vibration components smaller in number than the number of the vibration components that the vibration signal has, and synchronizes the another vibration signal with the acquired sound signal.
5. The information processing apparatus according to claim 4,
wherein the control unit generates the another vibration signal having the part of vibration components.
6. The information processing apparatus according to claim 4,
wherein the control unit determines amplitudes of the vibration components that the another vibration signal has, in accordance with a result of a vector operation based on the plurality of vibration components that the acquired vibration signal has.
7. The information processing apparatus according to claim 1,
wherein the control unit associates the vibration signal with the sound signal by synthesizing the vibration signal and the sound signal which have been synchronized, and
wherein the recoding unit records a synthesized signal in which the vibration signal and the sound signal have been synthesized.
8. The information processing apparatus according to claim 7,
wherein the control unit generates the synthesized signal by synthesizing a low frequency component of the vibration signal equal to or lower than a first threshold value and a high frequency component of the sound signal equal to or higher than a second threshold value.
9. The information processing apparatus according to claim 8,
wherein the first threshold value is set to a frequency higher than the second threshold value.
10. The information processing apparatus according to claim 7,
wherein the control unit determines whether to synthesize the vibration signal and the sound signal in accordance with a recording format for recording the vibration signal and the sound signal which have been synchronized.

11. The information processing apparatus according to claim 1,
wherein the control unit encodes the vibration signal and the sound signal which have been synchronized in accordance with a recording format for recording the vibration signal and the sound signal, and
wherein the recoding unit records the vibration signal and the sound signal which have been encoded.

12. The information processing apparatus according to claim 1,
wherein the control unit synchronizes the vibration signal with the sound signal based on a waveform of at least a part of signal in the vibration signal, and a waveform of at least a part of signal in the sound signal.

13. The information processing apparatus according to claim 12,
wherein the control unit synchronizes the vibration signal with the sound signal based on a waveform of the vibration signal and a waveform of the sound signal which are acquired in accordance with prescribed movement of the real object.

14. The information processing apparatus according to claim 1,
wherein the control unit converts, in accordance with a sampling rate of one signal of the vibration signal and the sound signal which have been synchronized, a sampling rate of the other signal, and associates the other signal, in which a sampling rate has been converted, with the one signal.

15. The information processing apparatus according to claim 14,
wherein the control unit converts a sampling rate of the other signal in accordance with the one signal of the vibration signal and the sound signal which have been synchronized, in which a sampling rate is high.

16. The information processing apparatus according to claim 15,
wherein the one signal is the sound signal, and
wherein the other signal is the vibration signal.

17. The information processing apparatus according to claim 1,
wherein the control unit calculates an amount of a delay generated between the successively acquired vibration signal and sound signal, and synchronizes the vibration signal and the sound signal by delaying at least any one of the vibration signal and the sound signal in accordance with the calculated delay amount.

18. An information processing method, implemented via at least one processor, the method comprising:
acquiring successively a vibration signal that indicates a detected vibration of a prescribed real object, and a sound signal that indicates a collected sound from the real object;
synchronizing, by a processor, the acquired vibration signal with the acquired sound signal, and associating the vibration signal and the sound signal with each other, the vibration signal and the sound signal having been synchronized; and
recording the vibration signal and the sound signal which have been associated with each other.

19. A non-transitory computer-readable medium having embodied thereon a program, which when executed by a computer causes the computer to execute a method, the method comprising:
acquiring successively a vibration signal that indicates a detected vibration of a prescribed real object, and a sound signal that indicates a collected sound from the real object;
synchronizing the acquired vibration signal with the acquired sound signal, and associating the vibration signal and the sound signal with each other, the vibration signal and the sound signal having been synchronized; and
recording the vibration signal and the sound signal which have been associated with each other.

* * * * *